(12) United States Patent
Seki et al.

(10) Patent No.: US 11,202,011 B2
(45) Date of Patent: Dec. 14, 2021

(54) CONTROL APPARATUS, IMAGE CAPTURING APPARATUS, LENS APPARATUS, IMAGE CAPTURING SYSTEM, CONTROL METHOD, AND STORAGE MEDIUM

(71) Applicant: CANON KABUSHIKI KAISHA, Tokyo (JP)

(72) Inventors: Hironori Seki, Sagamihara (JP); Hideya Takanashi, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/652,439

(22) Filed: Jul. 18, 2017

(65) Prior Publication Data

US 2018/0027187 A1    Jan. 25, 2018

(30) Foreign Application Priority Data

Jul. 25, 2016  (JP) .............................. JP2016-145112
Jul. 25, 2016  (JP) .............................. JP2016-145254

(51) Int. Cl.
*H04N 5/232*     (2006.01)
*H04N 5/225*     (2006.01)
(Continued)

(52) U.S. Cl.
CPC ......... *H04N 5/232935* (2018.08); *H04N 5/04* (2013.01); *H04N 5/2254* (2013.01); *H04N 5/23209* (2013.01); *H04N 5/23212* (2013.01); *H04N 5/23222* (2013.01); *H04N 5/23254* (2013.01); *H04N 5/23258* (2013.01);
(Continued)

(58) Field of Classification Search
None
See application file for complete search history.

(56) References Cited

U.S. PATENT DOCUMENTS 5,266,981 A   11/1993   Hamada et al.
5,416,554 A    5/1995   Hamada et al.
(Continued)

FOREIGN PATENT DOCUMENTS

CN    101489037 A    7/2009
CN    101742098 A    6/2010
(Continued)

OTHER PUBLICATIONS

Feb. 3, 2020 Chinese Official Action in Chinese Patent Appln. No. 201710613007.4.
(Continued)

*Primary Examiner* — Twyler L Haskins
*Assistant Examiner* — Wesley J Chiu
(74) *Attorney, Agent, or Firm* — Venable LLP

(57) ABSTRACT

A control apparatus includes a motion vector detector configured to detect a motion vector, a calculator configured to calculate angular velocity information of an object based on the motion vector and an angular velocity detected by an angular velocity detector, an acquirer configured to acquire a result of an image stabilizing control in capturing a still image based on the angular velocity information of the object, and a controller configured to control a display unit so as to display the still image and information of the result of the image stabilizing control superimposed on the still image.

18 Claims, 21 Drawing Sheets

(51) Int. Cl.
  *H04N 5/04* (2006.01)
  *H04N 5/14* (2006.01)
(52) U.S. Cl.
  CPC ... *H04N 5/23287* (2013.01); *H04N 5/232941* (2018.08); *H04N 5/145* (2013.01); *H04N 5/23245* (2013.01)

(56) References Cited

U.S. PATENT DOCUMENTS

| | | | |
|---|---|---|---|
| 5,463,443 A | 10/1995 | Tanaka et al. | |
| 5,546,159 A | 8/1996 | Imura et al. | |
| 5,561,485 A | 10/1996 | Hamada et al. | |
| 5,740,473 A | 4/1998 | Tanaka et al. | |
| 5,832,314 A | 11/1998 | Hamada et al. | |
| 5,978,601 A | 11/1999 | Hamada et al. | |
| 5,995,761 A * | 11/1999 | Wakabayashi | G02B 27/646 396/54 |
| 6,157,780 A | 12/2000 | Hamada et al. | |
| 6,181,875 B1 | 1/2001 | Hamada et al. | |
| 7,162,151 B2 | 1/2007 | Nonaka et al. | |
| 7,782,362 B2 | 8/2010 | Oshima | |
| 8,208,017 B2 | 6/2012 | Oshima | |
| 8,279,290 B2 | 10/2012 | Yamanaka | |
| 8,488,006 B2 | 7/2013 | Miyazaki | |
| 2005/0057660 A1 | 3/2005 | Nonaka et al. | |
| 2005/0276590 A1* | 12/2005 | Ishikawa | G02B 27/646 396/55 |
| 2006/0153554 A1* | 7/2006 | Misawa | G03B 5/04 396/55 |
| 2006/0170784 A1* | 8/2006 | Clarke | H04N 5/23248 348/208.99 |
| 2007/0098381 A1 | 5/2007 | Oshima | |
| 2007/0110418 A1* | 5/2007 | Imada | G03B 5/04 396/55 |
| 2007/0291114 A1 | 12/2007 | Oshima | |
| 2009/0179994 A1 | 7/2009 | Miyazaki | |
| 2009/0309983 A1* | 12/2009 | Ohara | H04N 5/23248 348/208.4 |
| 2010/0123787 A1 | 5/2010 | Yamanaka | |
| 2011/0228102 A1* | 9/2011 | Hashi | G03B 5/00 348/187 |
| 2011/0229118 A1* | 9/2011 | Imafuji | H04N 5/23209 396/529 |
| 2012/0066539 A1* | 3/2012 | Oikawa | H04N 5/23209 713/600 |
| 2013/0088610 A1* | 4/2013 | Lee | H04N 5/23254 348/208.99 |
| 2014/0049658 A1* | 2/2014 | Yamazaki | H04N 5/23267 348/208.11 |
| 2014/0204226 A1* | 7/2014 | Murakami | H04N 5/23287 348/208.1 |
| 2014/0307110 A1* | 10/2014 | Liu | H04N 5/23267 348/208.1 |
| 2014/0368912 A1* | 12/2014 | Imada | G02B 27/646 359/557 |
| 2015/0381887 A1* | 12/2015 | Sato | H04N 5/23209 348/207.11 |
| 2016/0173781 A1* | 6/2016 | Tsuchiya | H04N 5/23258 348/208.7 |
| 2016/0330377 A1* | 11/2016 | Tsuchiya | H04N 5/23209 |
| 2016/0360111 A1* | 12/2016 | Thivent | H04N 5/23287 |
| 2017/0223241 A1* | 8/2017 | Yamatsuta | H04N 5/2254 |

FOREIGN PATENT DOCUMENTS

| | | |
|---|---|---|
| JP | H03-100634 A | 4/1991 |
| JP | H05-249529 A | 9/1993 |
| JP | 2005-033785 A | 2/2005 |
| JP | 2005-064699 A | 3/2005 |
| JP | 2006-317848 A | 11/2006 |
| JP | 2015-161730 A | 9/2015 |
| JP | 2015-185925 A | 10/2015 |
| JP | 2015-197562 A | 11/2015 |

OTHER PUBLICATIONS

Jun. 23, 2020 Japanese Official Action in Japanese Patent Appln. No. 2016-145112.
Jun. 15, 2021 Chinese Official Action in Chinese Patent Appln. No. 201710613007.4.

* cited by examiner

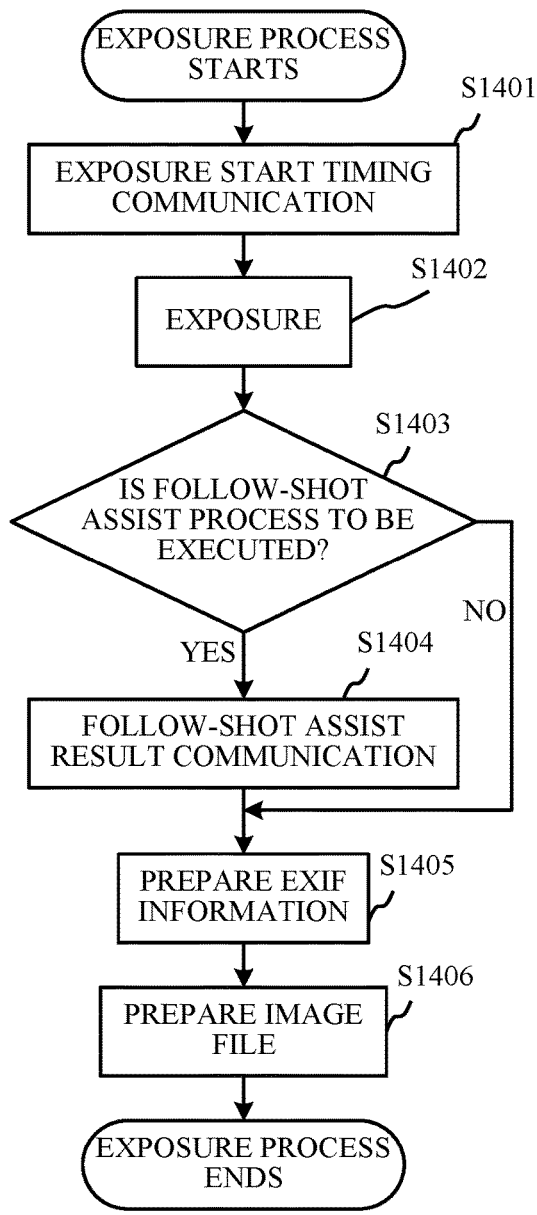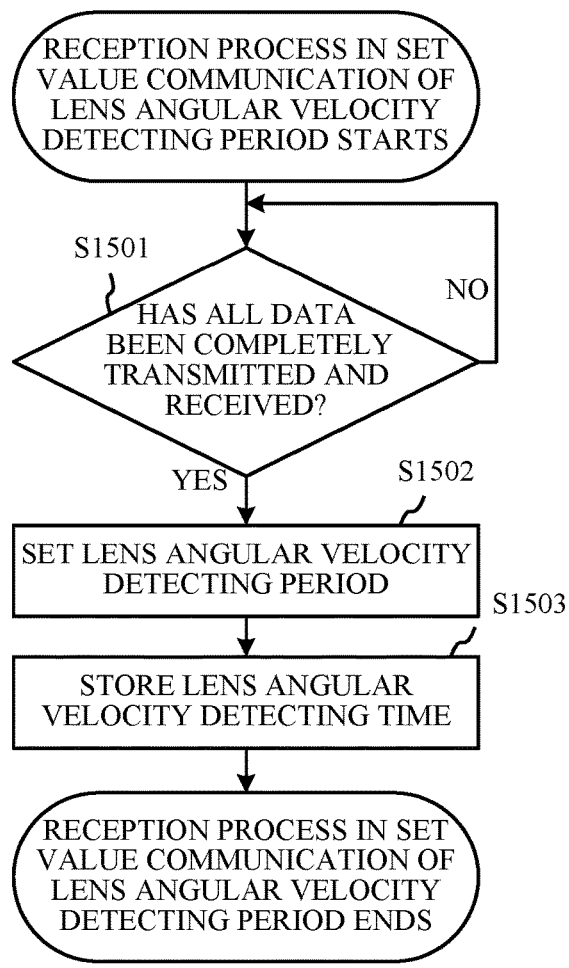
FIG. 14
FIG. 15

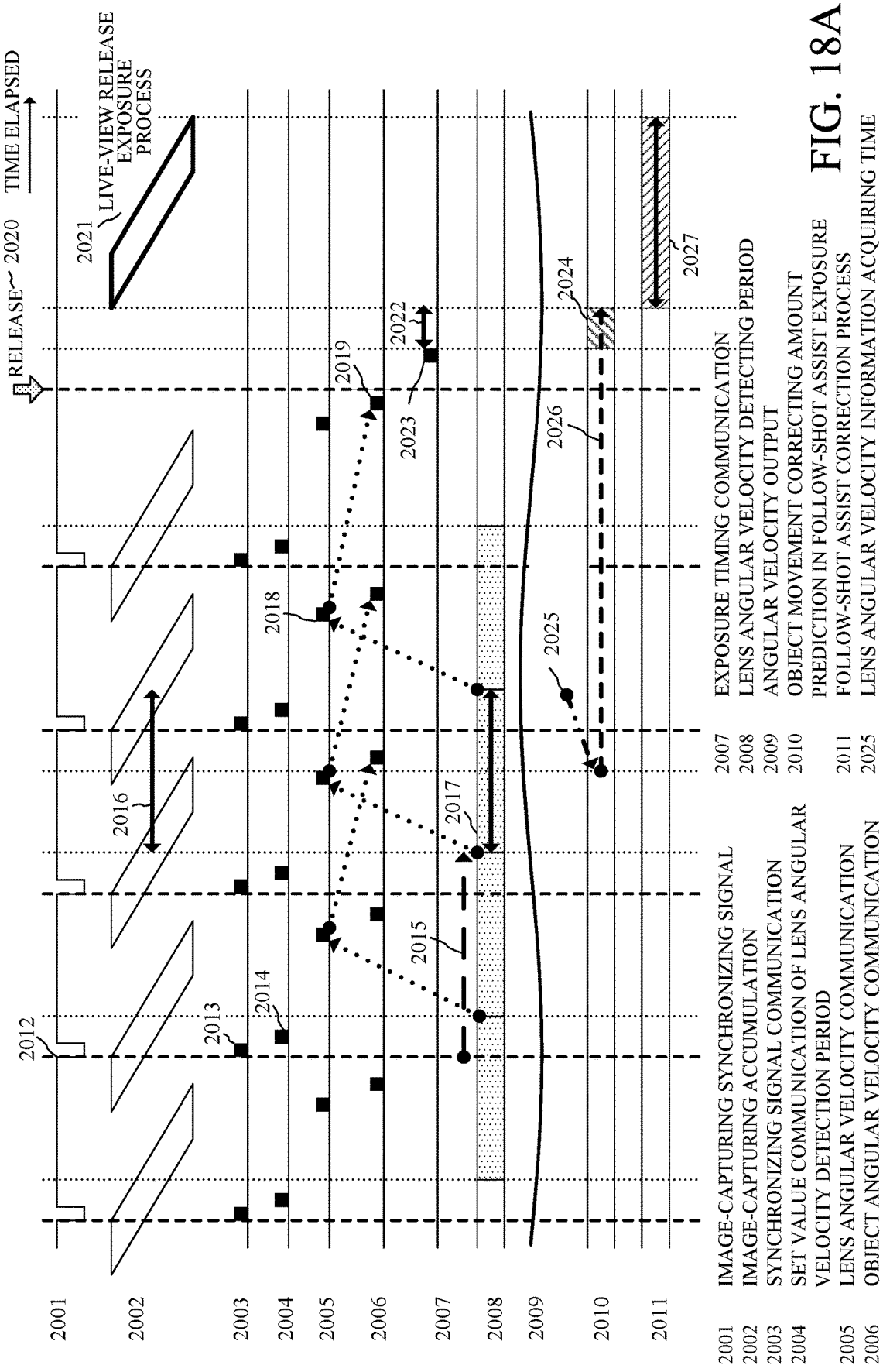

CONTROL APPARATUS, IMAGE CAPTURING APPARATUS, LENS APPARATUS, IMAGE CAPTURING SYSTEM, CONTROL METHOD, AND STORAGE MEDIUM

BACKGROUND OF THE INVENTION

Field of the Invention

The present invention relates to an image capturing apparatus that can provide a follow-shot assist.

Description of the Related Art

A follow shot is an imaging technique for expressing a speedily moving object. This imaging technology attempts to make a moving object still on a fluid background as a result of that a photographer pans a camera in association with the moving object.

The photographer needs to pan the camera in conformity with the moving object in this imaging technique, and an excessive high or low panning velocity causes a blurred image of the object because of a difference between the moving velocity of the object and the panning velocity. The follow-shot assist as one solution for this problem is proposed as a technique to assist the photographer in follow-shot imaging. The follow-shot assist is a method for absorbing the difference between the moving velocity of the object and the panning velocity by moving a shift lens for an image stabilization based on the panning velocity and a motion vector of the object detected based on the image.

Japanese Patent Laid-Open No. ("JP") 2015-197562 discloses an image capturing apparatus configured to calculate a follow-shot correction amount based on a motion vector amount of an object image and a panning velocity, to move a shift lens with still image capturing, and thereby to capture a beautiful follow-shot image.

However, the image capturing apparatus disclosed in JP 2015-197562 does not consider the calculated follow-shot correction amount beyond a movable range of the shift lens for the image stabilization (or an image stabilizing control lens). When the photographer cannot obtain beautiful follow-shot imaging, the photographer needs to determine based on the image whether he improperly panned the camera or the follow-shot assist made an improper image stabilization because a camera misapprehended the object etc. Moreover, the photographer needs trial and error in improving his panning when the panning was improper.

JP 2006-317848 discloses a follow-shot method for detecting a difference between an object velocity and a camera panning velocity and for correcting a shift amount corresponding to the difference using the image stabilizing function. JP 2015-161730 discloses a method for improving a detection accuracy of an object moving velocity by changing an output timing of a vibration detector according to an exposure time period and a frame rate, and by conforming a motion vector amount of an object image to the output timing of the vibration detector.

However, the methods disclosed in JPs 2006-317848 and 2015-161730 can be executed in a lens integrated camera in which a motion vector detector, an image stabilizing controller, and a follow-shot assist controller are provided in the same body, and cannot be executed in a lens interchangeable camera system.

In general, a CPU that controls a camera body in the lens interchangeable camera system always performs parallel processing for a variety of installed functions, and follow-shot assist processing may be delayed depending on the priority of the parallel processing. In the data communication (lens communication) through mount terminals between the camera body and the interchangeable lens, the follow-shot assist communication may be delayed since communications for a focus lens control, a diaphragm control, a state acquisition, etc. may interrupt.

In other words, in the lens interchangeable camera system, the lens communication at a predicted timing may be unavailable due to the unavailable lens communication band and the CPU load concentration.

Use of the motion vector and lens angular velocity having different detecting timings would cause an erroneous calculation of the object angular velocity, a performance deterioration, and a malfunction. The photographer may capture a still image at an arbitrary timing. Even when the lens communication for the follow-shot assist is not completed, it is necessary to keep a release responsiveness and to realize the follow-shot assist for correcting a moving component of the object. In order to improve the follow-shot assist performance in the lens interchangeable camera system, it is necessary to properly control the timings for the motion vector and the lens angular velocity.

SUMMARY OF THE INVENTION

The present invention provides a control apparatus, an image capturing apparatus, a lens apparatus, a control method, and a storage medium, which can feed back a follow-shot assist result to a photographer when a follow-shot correction amount exceeds a movable range of an image stabilizing control lens, or improve a follow-shot assist performance.

A control apparatus according to one aspect of the present invention includes a motion vector detector configured to detect a motion vector, a calculator configured to calculate angular velocity information of an object based on the motion vector and an angular velocity detected by an angular velocity detector, an acquirer configured to acquire a result of an image stabilizing control in capturing a still image based on the angular velocity information of the object, and a controller configured to control a display unit so as to display the still image and information of the result of the image stabilizing control superimposed on the still image.

Further features of the present invention will become apparent from the following description of exemplary embodiments with reference to the attached drawings.

BRIEF DESCRIPTION OF THE DRAWINGS

FIG. 14 is a flowchart of an exposure process by the camera body according to each embodiment.

FIG. 15 is a flowchart of a reception process in a setting communication of a lens angular velocity detecting period by the interchangeable lens according to each embodiment.

FIGS. 18A, 18B and 18C are timing charts of a follow-shot assist process by a camera system according to a third embodiment.

DESCRIPTION OF THE EMBODIMENTS

Referring now to the accompanying drawings, a detailed description will be given of embodiments of the present invention.

First Embodiment

Figure 1:
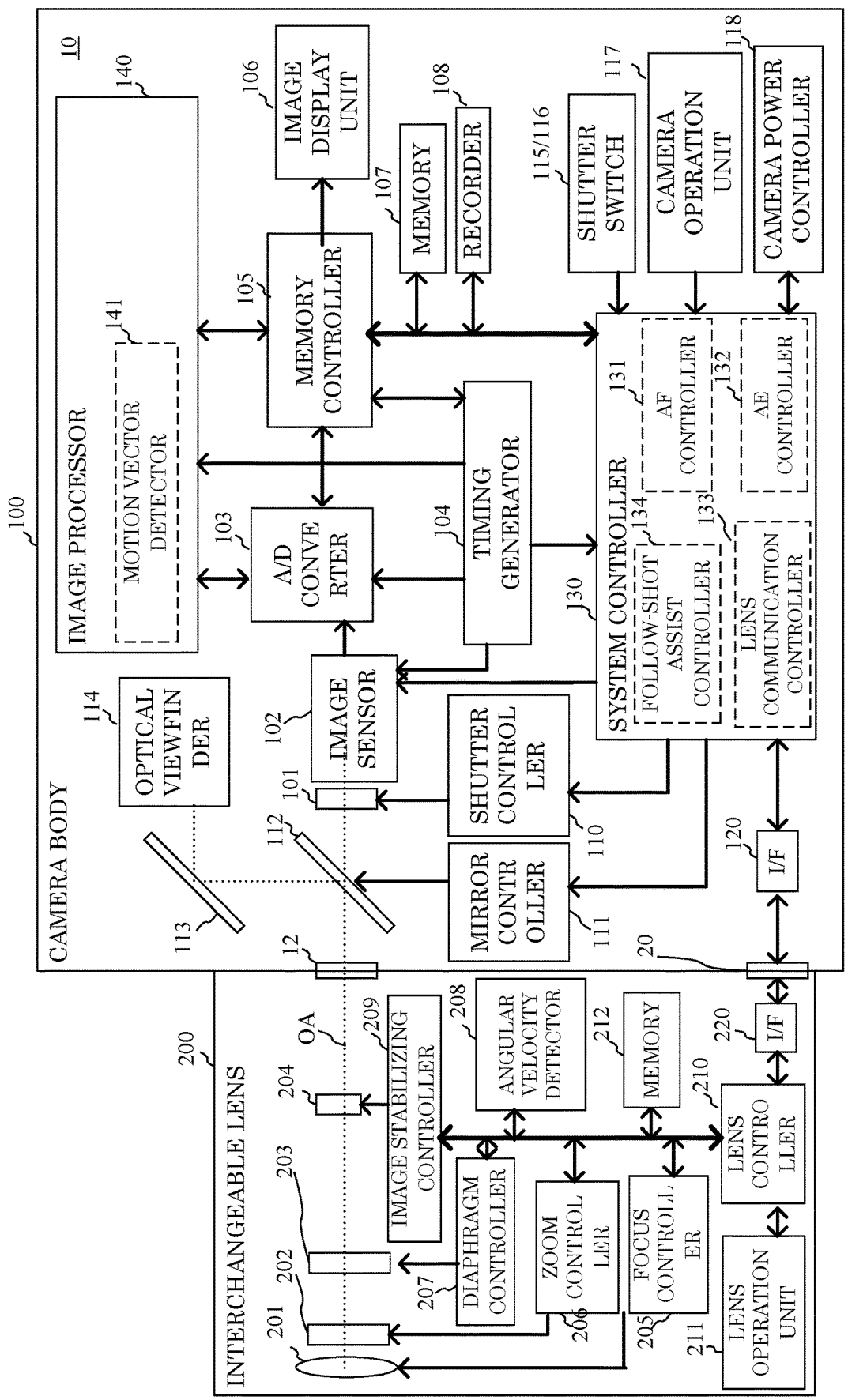
FIG. 1 is a block diagram of a camera system according to each embodiment.

Referring now to FIG. 1, a description will be given of a camera system according to a first embodiment of the present invention. FIG. 1 is a block diagram of a camera system 10 (image capturing apparatus or image capturing system). In this embodiment, the camera system 10 includes a camera body 100 (image capturing apparatus or image capturing apparatus body) and an interchangeable lens 200 (lens apparatus) attached to and detached from the camera body 100. This embodiment is not limited to this example, and is applicable to an image capturing apparatus in which the image capturing apparatus body is integrated with the lens apparatus.

As illustrated in FIG. 1, the interchangeable lens 200 is detachably attached to the camera body 100 of this embodiment via a lens mount unit 12. The interchangeable lens 200 attachable to the camera body 100 includes an image capturing optical system that includes a focus lens 201, a zoom control unit 202, a diaphragm (aperture stop) 203, and an image stabilizing control lens 204. FIG. 1 illustrates one lens that represents each of the focus lens 201, the zoom control unit 202 (zoom lens), and the image stabilizing control lens 204, but each lens may include a lens unit that includes a plurality of lenses. A light flux formed via the image capturing optical system is introduced to an image sensor 102 and forms an optical image on the image sensor 102.

A description will now be given of a configuration of the camera body 100. A shutter 101 controls an exposure amount to the image sensor 102. The image sensor 102 includes a CCD sensor or a CMOS sensor, and converts the optical image of an object into an analog image signal. In other words, the image sensor 102 photoelectrically converts the optical image formed by the image capturing optical system, and outputs an image signal. The image sensor 102 may include a plurality of pixels used for a focus detection (focus detecting pixels). An A/D converter 103 converts the analog image signal output from the image sensor 102 into a digital image signal, and outputs the digital signal to an image processor 140 and a memory controller 105. The optical image of the object can be observed by an optical viewfinder 114 through mirrors 112 and 113, while the mirror 112 moves down. A timing generator 104 supplies a clock signal and a synchronizing signal to the image sensor 102, the A/D converter 103, the image processor 140, the memory controller 105, and a system processor 130.

The image processor 140 performs a predetermined pixel interpolation process and a color conversion process for the digital image signal from the A/D converter 103 and data from the memory controller 105 and generates image data. The image processor 140 performs a predetermined calculation process with the digital image signal. The image processor 140 determines an object position, and follows the object based on a color and a shape of the object. The image processor 140 includes a motion vector detector 141. The motion vector detector 141 detects a motion vector (motion vector amount) based on the object position over a plurality of frames of the followed object. The object position includes an upper left coordinate, a height, and a width of the object. The calculated result of the image processor 140 is output to the system controller 130 via the memory controller 105.

The memory controller 105 controls the A/D converter 103, the timing generator 104, the image processor 140, the memory 107, a recorder 108, and an image display unit 106. The output data from the A/D converter 103 is written in the memory 107 and the recorder 108 via the image processor 140 and the memory controller 150. The memory 107 and the recorder 108 stores captured still and motion images. The memory 107 includes a nonvolatile memory, and is used for a working area of the system controller 130. The recorder 108 is used for an image recording area that includes a non-volatile memory attached to the inside or outside of the camera body 100.

The image display unit 106 (display unit) includes an LCD, and displays an image output from the A/D converter 103 or the image recorded in the recorder 108. The image display unit 106 can display an image capturing condition, such as a shutter speed, a follow-shot assist result, and an object position, by superimposing them on the image. As described above, the system controller 130 (controller) makes a control so as to make the image display unit 106 display a still image on which information on an image stabilizing control result is superimposed. A shutter controller 110 controls the shutter 101 in association with a mirror controller 111 based on the control signal from the system controller 130. The mirror controller 111 controls the mirror 112 based on a control signal from the system controller 130.

The system controller 130 controls the entire camera system 10 that includes the camera body 100 based on input signals from a shutter switch 115 (SW1), a shutter switch 116 (SW2), a camera operation unit 117, and a memory controller 105. In other words, the system controller 130 controls the image sensor 102, the memory controller 105, the shutter controller 110, the mirror controller 111, the interchangeable lens 200 via an I/F 120 etc., in accordance with each of the above input signals.

The shutter switch 115 (SW1) instructs operation starts for an AF process, an AE process, an AWB process, etc. to the system controller 130. The shutter switch 116 (SW2) instructs an exposure start to the system controller 130. The system controller 130 that has received the exposure start instruction controls the interchangeable lens 200 via the mirror controller 111, the shutter controller 110, the memory controller 105, and the I/F 120, and starts an exposure of the image sensor 102. The system controller 130 ends the exposure after a time period for the shutter speed passes. The system controller 130 converts a still image exposed by the image sensor 102 into digital data via the A/D converter 103, and saves it in the memory controller 105. In this case, the memory controller 105 saves the image capturing condition and the follow-shot assist result. Thereafter, the system controller 130 stores the still image stored in the memory controller 105, as JPEG and RAW data. The image capturing condition and the follow-shot assist result are embedded in the still image data as EXIF information.

A camera operation unit 117 includes a variety of buttons, a touch panel, a power on/off button, etc., and outputs a command accepted by the operation by the photographer to the system controller 130. In accordance with the operation of the photographer via the camera operation unit 117, the system controller 130 selects each operation mode, such as an AF mode, and AE mode, and a follow-shot assist mode, as one of the variety of functions in the camera body 100. A camera power controller 118 controls an external battery and an internal battery of the camera body 100. Where the battery is detached or remaining battery amount runs short, the camera power controller 118 emergently turns off a control over the camera body 100. In this case, the system controller 130 shuts down the power supplied to the interchangeable lens 200.

An AF controller 131 is provided in the system controller 130, and controls the AF process in the camera body 100. In the AF process, the AF controller 131 calculates a drive amount of the focus lens 201 based on the lens information, such as a focus position and a focal length, obtained from the interchangeable lens 200 via the I/F 120 and the AF evaluation value in accordance with the AF mode. The drive amount of the focus lens 201 is input into the interchangeable lens 200 via the lens communication controller 133 in the system controller 130 and the I/F 120. For example, in the phase difference AF mode, the AF controller 131 calculates the drive amount of the focus lens 201 based on a phase difference AF evaluation value etc. obtained by introducing the optical image of the object into the mirror 112, an unillustrated focus detecting sub mirror, and an unillustrated focus state determining unit. In a contrast AF mode, the AF controller 131 calculates the drive amount of the focus lens 201 based on a contrast AF evaluation value calculated in the image processor 140. In an image-plane phase difference AF mode, the AF controller 131 calculates the drive amount of the focus lens 201 based on an image-plane phase difference AF evaluation value output from pixels (used for the focus detection) on the image sensor 102. The AF controller 131 switches a position of the AF frame used to calculate the evaluation value in accordance with an AF evaluation mode such as a single point AF mode, a multi-point AF mode, and a face detection AF mode.

An AE controller 132 is provided in the system controller 130, and controls the AE process in the camera body 100. In the AE process, the AE controller 132 calculates an AE control amount (such as a diaphragm control amount, a shutter control amount, and an exposure sensitivity) based on lens information, such as an open F-number and a focal length, obtained from the interchangeable lens 200 via the I/F 120, and an AE evaluation value in accordance with the AE mode. The diaphragm control amount is input into the interchangeable lens 200 via the lens communication controller 133 and the I/F 120. The shutter control amount is input into the shutter controller 110. The exposure sensitivity is input into the image sensor 102. For example, in a viewfinder imaging mode, the AE controller 132 calculates the AE control amount based on the AE evaluation value obtained by introducing the optical image of the object into the mirrors 112 and 113 and an unillustrated brightness determining unit. In the live-view imaging mode, the AE controller 132 calculates the AE control amount based on the AE evaluation value calculated in the image processor 140. The AE controller 132 selects an AE frame position and a weighting value used to calculate the evaluation value in accordance with a photometry mode, such as an evaluation photometry mode, an average photometry mode, and a face detection photometry mode.

A follow-shot assist controller 134 is provided in the system controller 130, and controls the follow-shot assist process in the camera body 100. The follow-shot assist function is available where the live-view imaging mode is set and the attached interchangeable lens 200 is compatible with the follow-shot assist. If the follow-shot assist function is unavailable, the follow-shot assist controller 134 controls a flow amount in an image in accordance with the follow-shot assist mode. More specifically, the follow-shot assist controller 134 notifies the AE controller 132 of a shutter control amount such that a blur angle in exposure can be an arbitrary amount and controls the flow amount in the image, based on the angular velocity information etc. obtained from the angular velocity detector 208 in the interchangeable lens 200.

On the other hand, when the follow-shot assist function is available, the follow-shot assist controller 134 instructs the availability of the follow-shot assist process to the interchangeable lens 200 via the I/F 120 in accordance with the follow-shot assist mode. The follow-shot assist controller 134 calculates angular velocity information of the object, such as an object angular velocity and an object angular acceleration, based on the lens information, such as the lens angular velocity information and the focal length, obtained from the interchangeable lens 200 via the I/F 120, the motion vector amount input from the image processor 140, etc. Thus, the follow-shot assist controller 134 serves as a calculator configured to calculate (obtain) the angular velocity information of the object based on the motion vector and the angular velocity detected by the angular velocity detector 208.

The follow-shot assist controller 134 calculates a set value of a lens angular velocity detecting period based on the frame rate, the shutter speed, etc. such that the lens angular velocity detecting period coincides with the motion vector detection period. The set value of the lens angular velocity detecting period is input into the interchangeable lens 200 via the lens communication controller 133 and the I/F 120. The set value of the lens angular velocity detecting period contains angular velocity ID information. The angular velocity ID information is added so that the follow-shot assist controller 134 can identify which period the lens angular velocity received from the interchangeable lens 200 belongs to. The lens angular velocity information also contains the angular velocity ID information, and the angular velocity ID information and the lens angular velocity information are tagged with each other and sent to the camera body 100.

A lens communication controller 133 is provided in the system controller 130, and controls a communication process between the camera body 100 and the interchangeable lens 200. When the lens communication controller 133 detects the attachment of the interchangeable lens 200 via the I/F 200, the lens communication controller 133 starts the communication between the camera body 100 and the interchangeable lens 200 so as to receive necessary lens information and to send necessary camera information and a necessary driving command. For example, assume that the live-view imaging mode is set and the attached interchangeable lens 200 is compatible with the follow-shot assist. Then, when an image-capturing synchronizing signal is input from the timing generator 104, the lens communication controller 133 executes a synchronizing signal communication for notifying a communication start delay time from when the image-capturing synchronizing signal is input to when the communication starts. When the exposure by the shutter switch 116 (SE2) ends, the lens communication controller 133 receives follow-shot assist result information from the interchangeable lens 200. When the image-capturing synchronizing signal is input from the timing generator 104 in the live-view imaging mode, the lens communication controller 133 receives various lens information simultaneously, such as a focus lens position, a focus lens state, a diaphragm state, and a focal length.

The I/F 120 is an interface for the communication between the camera body 100 and the interchangeable lens 200. The I/F 120 sends and receives the lens information, the control command, etc. through a communication with an electric signal via the connector 20 between the system controller 130 in the camera body 100 and the lens controller 210.

Next follows a description of the configuration of the interchangeable lens 200. The focus lens 201 moves in a direction along an optical axis OA (optical axis direction) and adjusts a focus (focus state) in the image capturing optical system. The focus controller 205 is controlled by the lens controller 210, and drives the focus lens 201. The focus controller 205 outputs focus information, such as a position of the focus lens 201, to the lens controller 210.

The zoom control unit 202 moves in the optical axis direction and changes a focal length of the image capturing optical system. The zoom controller 206 is controlled by the lens controller 210, and drives a zoom control unit 202. The zoom controller 206 outputs zoom information, such as a focal length, to the lens controller 210. The diaphragm 203 has a variable aperture diameter (F-number) and changes a light quantity according to the aperture diameter. The diaphragm controller 207 is controlled by the lens controller 210, and drives the diaphragm 203. The diaphragm controller 207 outputs the diaphragm information, such as an F-number, to the lens controller 210.

An image stabilizing control lens 204 moves in a direction orthogonal to the optical axis OA (optical axis orthogonal direction), and reduces an image blur caused by a camera vibration or a manual blur. The image stabilizing controller 209 is controlled by the lens controller 210, and drives the image stabilizing control lens 204. The image stabilizing controller 209 outputs image stabilizing information, such as an image stabilizable range, to the lens controller 210.

The angular velocity detector 208 detects an angular velocity of the interchangeable lens 200 (in the Yaw direction and in the Pitch direction), and outputs the detected result to the lens controller 210. The angular velocity detector 208 is controlled by the lens controller 210. The angular velocity detector can be provided into the camera body 100.

A lens operation unit 211 includes a focus ring, a zoom ring, an AF/MF switch, an IS (image stabilization) on/off switch, etc., and outputs a command accepted by the operation of the photographer to the lens controller 210. The system controller 130 switches the operation mode for each type of function mounted on the interchangeable lens 200 in accordance with the operation of the photographer on the lens operation unit 211. A memory 212 includes a nonvolatile memory.

The controller 210 controls the focus controller 205, the zoom controller 206, the diaphragm controller 207, the image stabilizing controller 209, the angular velocity detector 208, etc. in accordance with the input signal from the lens operation unit 211 or the I/F 220. Thereby, the lens controller 210 controls the entire interchangeable lens 200. The lens controller 210 sends information input from each controller and each detector to the camera body 100 via the I/F 220, in response to a lens information acquiring command received via the I/F 220.

The I/F 220 is an interface for a communication between the camera body 100 and the interchangeable lens 200. The I/F 220 sends and receives the lens information, the control command, etc. through a communication with an electric signal via the connector 20 between the system controller 130 in the camera body 100 and the lens controller 210. As described later, the I/F 220 sends an image stabilizing control result (follow-shot assist result) after a still image is captured, to the camera body 100.

Figure 2:
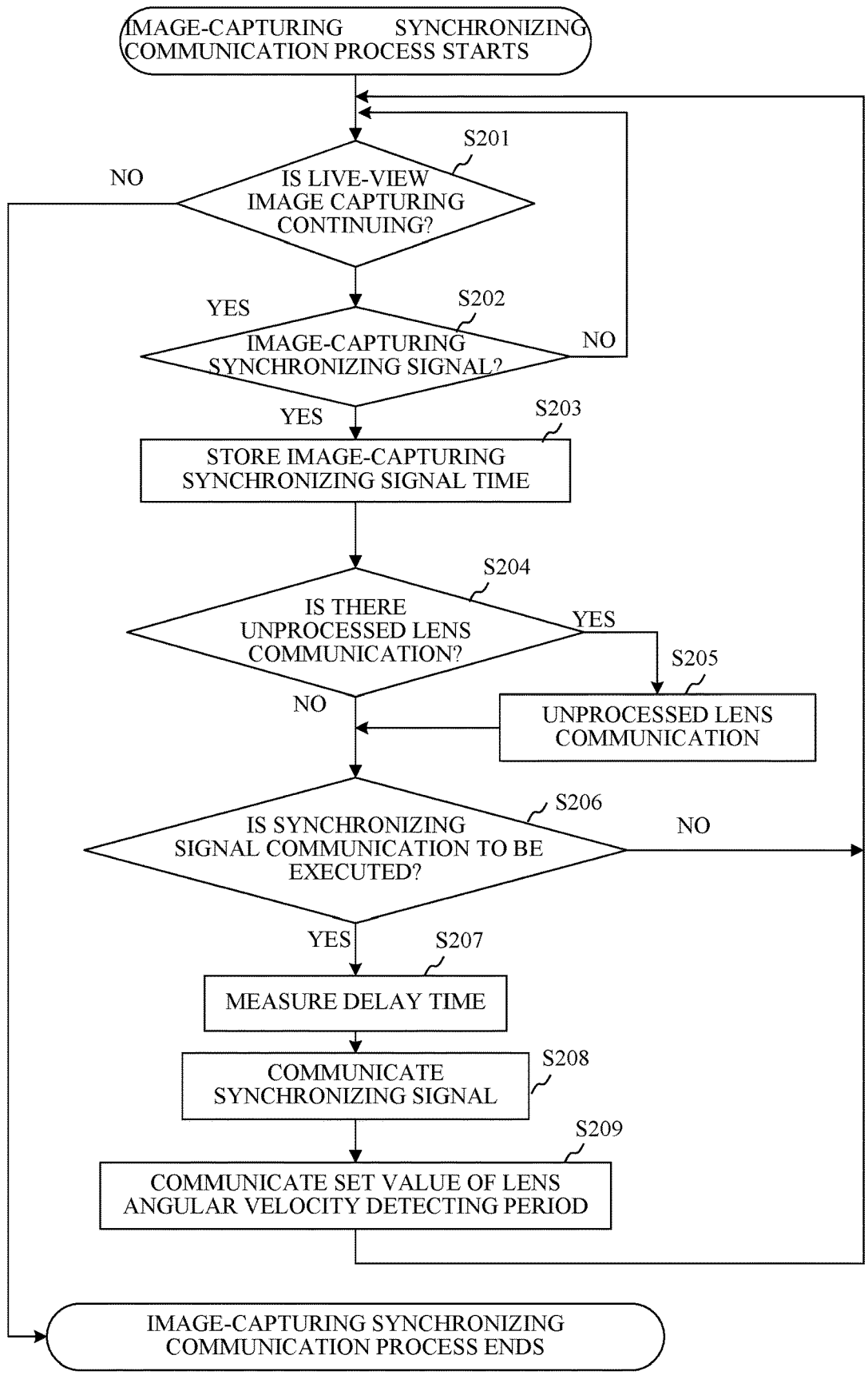
FIG. 2 is a flowchart of an image-capturing synchronizing communication process by a camera body according to each embodiment.

Referring now to FIG. 2, a description will be given of the image-capturing synchronizing communication process in the camera body 100 according to this embodiment. FIG. 2 is a flowchart of the image-capturing synchronizing communication process in the camera body 100 in the live-view imaging mode where the attached interchangeable lens 200 is compatible with the follow-shot assist. The image-capturing synchronizing communication process starts with the live-view imaging mode so that the lens controller 210 can communicate with the camera body 130 at a timing of the image-capturing synchronizing signal.

Initially, in the step S201, the system controller 130 determines whether the live-view imaging mod is continuing. Where the live-view imaging is continuing, the flow moves to the step S202. Where the live-view imaging is not continuing, the image-capturing synchronizing communication process of this flow ends.

In the step S202, the system controller 130 determines whether the image-capturing synchronizing signal has been input. Where the image-capturing synchronizing signal is input, the flow moves to the step S203. Where the image-capturing synchronizing signal is not input, the flow returns to the step S201. In the step S203, the system controller 130 stores the input time of the image-capturing synchronizing signal as image-capturing synchronizing signal time in the unillustrated internal memory in the system controller 130 or the memory 107. Next, in the step S204, the system controller 130 determines whether there is an unprocessed lens communication. When there is an unprocessed lens communication, the flow moves to the step S205. When there is no unprocessed lens communication, the flow moves to the step S206. In the step S205, the system controller 130 completes the unprocessed lens communication and the flow moves to the step S206.

In the step S206, the system controller 130 determines whether the synchronizing signal communication is to be executed. Where the interchangeable lens 200 is compatible with the follow-shot assist and the follow-shot assist mode is valid, the system controller 130 determines that the synchronizing signal communication is to be executed and the flow moves to the step S207. Where the system controller 130 determines that the synchronizing signal communication is not to be executed, the flow moves to the step S201.

In the step S207, the system controller 130 measures the time elapsed from the image-capturing synchronizing signal time, and stores the time elapsed as the delay time (synchronizing signal communication delay time) in the internal memory or the memory 107. Next, in the step S208, the system controller 130 communicates the synchronizing signal to the interchangeable lens 200 via the I/F 120. The transmission data in the synchronizing signal communication contains a synchronizing signal delay time. Next, in the step S209, the system controller 130 communicates a set value communication of the lens annular velocity detecting period to the interchangeable lens 200 via the I/F 120, and returns to the step S201. As transmission data in the set value communication of the lens angular velocity detecting period, the system controller 130 sends the set value of the lens angular velocity detecting period input from the follow-shot assist controller 134.

Due to the above process, the camera body 100 can notify the interchangeable lens 200 of the image-capturing synchronizing signal, and sets the lens angular velocity detecting period.

Figure 3:
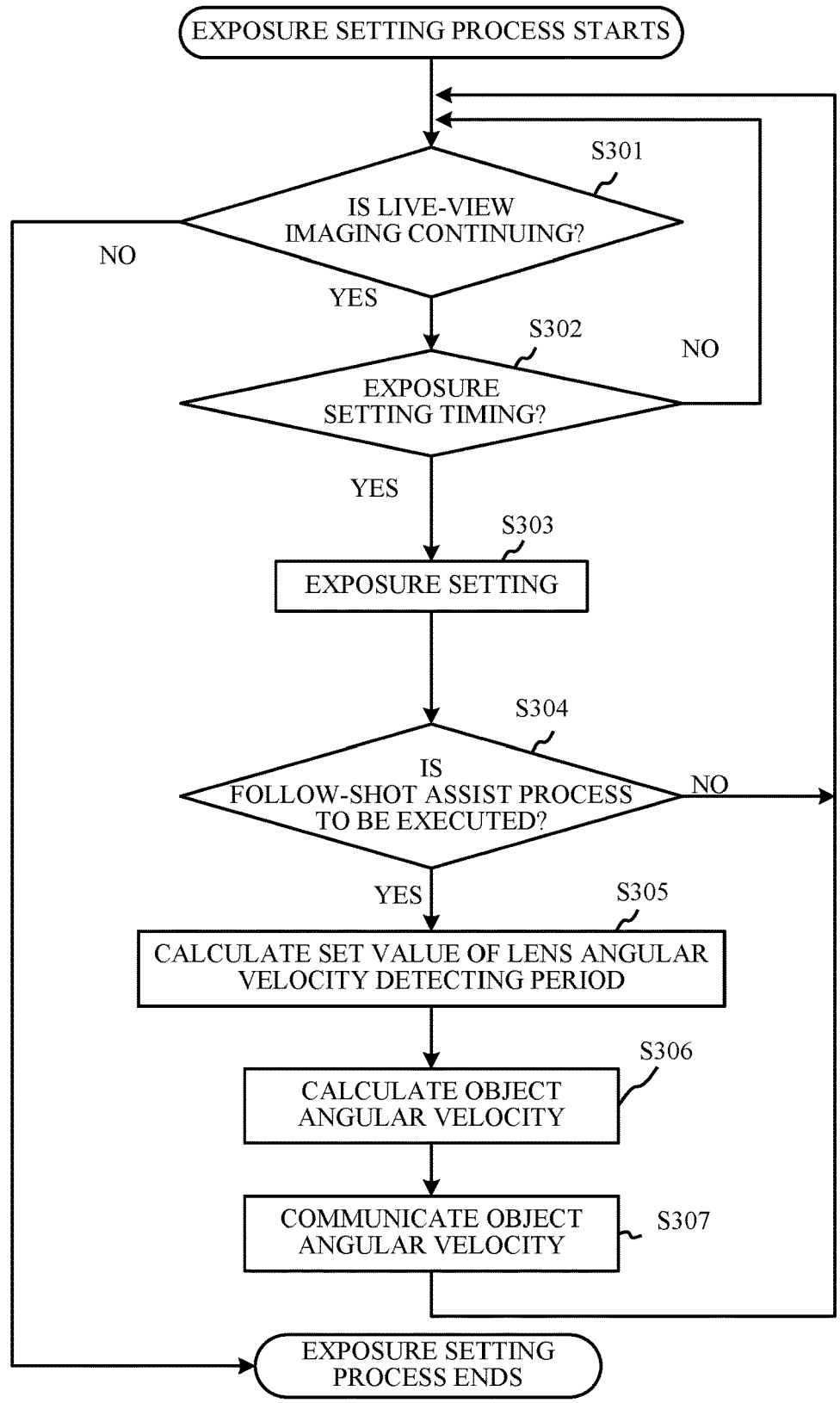
FIG. 3 is a flowchart of an exposure setting process by the camera body according to each embodiment.

Referring now to FIG. 3, a description will be given of an exposure setting process in the camera body 100. FIG. 3 is a flowchart of an operation of the exposure setting process in the camera body 100 in the live-view imaging mode where the attached interchangeable lens 200 is compatible with the follow-shot assist. The exposure setting process is executed for each frame in the live-view imaging mode for an exposure control over the next frame.

Initially, in the step S301, the system controller 130 determines whether the live-view imaging is continuing. Where the live-view imaging is continuing, the flow moves to the step S302. Where the live-view imaging is not continuing, the exposure setting process of this flow ends.

In the step S302, the system controller 130 determines whether it is the exposure setting timing of the image sensor 102 for the next frame. Where it is the exposure setting timing, the flow moves to the step S303. Where it is not the exposure setting timing, the flow moves to the step S301.

In the step S303, the system controller 130 calculates an exposure set value based on the AE control amount, the camera mode, etc. The system controller 130 controls the exposure for the next frame by outputting the exposure set value to the memory controller 105. Next, in the step S304, the follow-shot assist controller 134 determines whether the follow-shot assist process is to be executed. Where the interchangeable lens 200 is compatible with the follow-shot assist and the follow-shot assist mode is valid, the follow-shot assist controller 134 determines that the follow-shot assist process is to be executed and the flow moves to the step S305. Where the follow-shot assist controller 134 determines that the follow-shot assist process is not to be executed, the flow returns to the step S301.

In the step S305, the follow-shot assist controller 134 calculates the set value of the lens angular velocity detecting period as a relative time period from the image-capturing synchronizing signal based on the exposure setting for the next frame, etc. such that the motion vector detecting period coincides with the lens angular velocity detecting period. The calculated set value of the lens angular velocity detecting period is sent to the interchangeable lens 200 in the step S209. The set value of the lens angular velocity detecting period contains angular velocity ID information. The angular ID information is added so that the follow-shot assist controller 134 can identify which period the lens angular velocity received from the interchangeable lens 200 belongs to. The lens angular velocity information also contains the angular velocity ID information, and the angular velocity ID information and the lens angular velocity information are tagged with each other and sent to the camera body 100.

Next, in the step S306, the follow-shot controller 134 calculates the angular velocity information of the object based on the lens information, such as the lens angular velocity information and the focal length received from the interchangeable lens 200, and the motion vector amount input from the image processor 140. The angular velocity information of the object contains the object angular velocity and the object angular acceleration. The follow-shot assist controller 134 inputs the calculated angular velocity information of the object into the lens communication controller 133. The angular velocity information of the object contains the lens angular velocity information acquiring time period corresponding to the lens angular velocity information used for the calculation. The follow-shot assist controller 134 stores the object position detected by the image processor 140 in the memory 107 via the memory controller 105. One or more object positions containing the latest value are stored in the memories 107. When these processes end, the system controller 130 moves to the step S307. In the step S307, the lens communication controller 133 communicates the object angular velocity so as to send the object angular velocity information to the interchangeable lens 200, and moves to the step S301. In this embodiment, the reception data in the object angular velocity communication contains the lens angular velocity information.

Due to the above processes, this embodiment can control the exposure for the next frame and set the lens angular velocity detecting period to be notified to the interchangeable lens 200 with the next image-capturing synchronizing signal. This embodiment can notify the interchangeable lens 200 of the object angular velocity and obtain the lens angular velocity information from the interchangeable lens 200.

Figure 4:
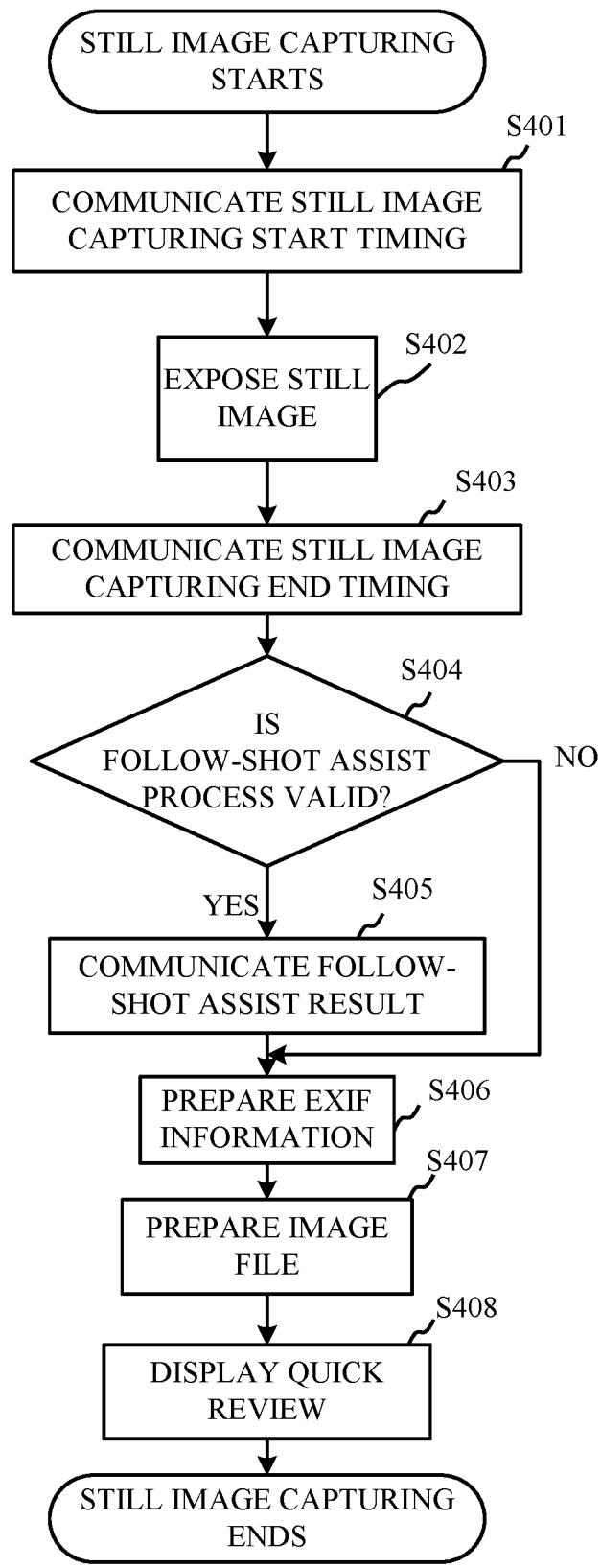
FIG. 4 is a flowchart of still image capturing by the camera body according to each embodiment.

Referring now to FIG. 4, a description will be given of a live-view still image imaging process in the camera body 100. FIG. 4 is a flowchart of a still image imaging process (live-view still image imaging process) in the camera body 100. FIG. 4 illustrates an operation of the live-view still image imaging process in the camera body 100 in the live-view imaging mode where the attached interchangeable lens 200 is compatible with the follow-shot assist. The live-view still image capturing process starts with a still image capturing start command via the shutter switch 116 in the live-view imaging mode.

Initially, in the step S401, the system controller 130 notifies the interchangeable lens 200 of the still image capturing start timing via a communication with the lens communication controller 133. Next, in the step S402, the system controller 130 controls the shutter controller 110 and the image sensor 102, executes the still image exposure process, and obtains image data. The image data is stored in the memory 107 via the image processor 140 and the memory controller 105. When the process ends, the flow moves to the step S403. In the step S403, the system controller 130 notifies the interchangeable lens 200 of a still image capturing end timing via a communication with the lens communication controller 133.

Next, in the step S404, the lens communication controller 133 determines whether the follow-shot assist process is to be executed. Where the interchangeable lens 200 is compatible with the follow-shot assist and the follow-shot assist mode is valid, the lens communication controller 133 determines that the follow-shot assist process is to be executed, and moves to the step S405. Where the follow-shot assist process is not to be executed, the flow moves to the step S406.

In the step S405, the lens communication controller 133 executes a communication for receiving follow-shot assist result information from the interchangeable lens 200. Herein, the lens communication controller 133 (acquirer) acquires the image stabilizing control result (follow-shot assist result) in the still image capturing executed based on the angular velocity information of the object. The lens communication controller 133 may obtain the image stabilizing control result from the interchangeable lens 200 by a communication with the interchangeable lens 200 after the still image is captured.

Next, in the step S406, the system controller 130 prepares EXIF information to be added to the image file. The EXIF information is recorded in the memory 107 via the memory controller 105. In this embodiment, the EXIF information contains an image capturing condition, such as the lens information, the shutter speed, and the F-number, and follow-shot assist result information received in the step S405. The follow-shot result information contains a success or failure of the follow-shot assist, an object angular velocity V, which will be described later, a follow-shot assist amount average value Ga, and a panning amount average value ga. The EXIF information contains the latest object position stored in the memory 107 in the step S306.

Figure 11:
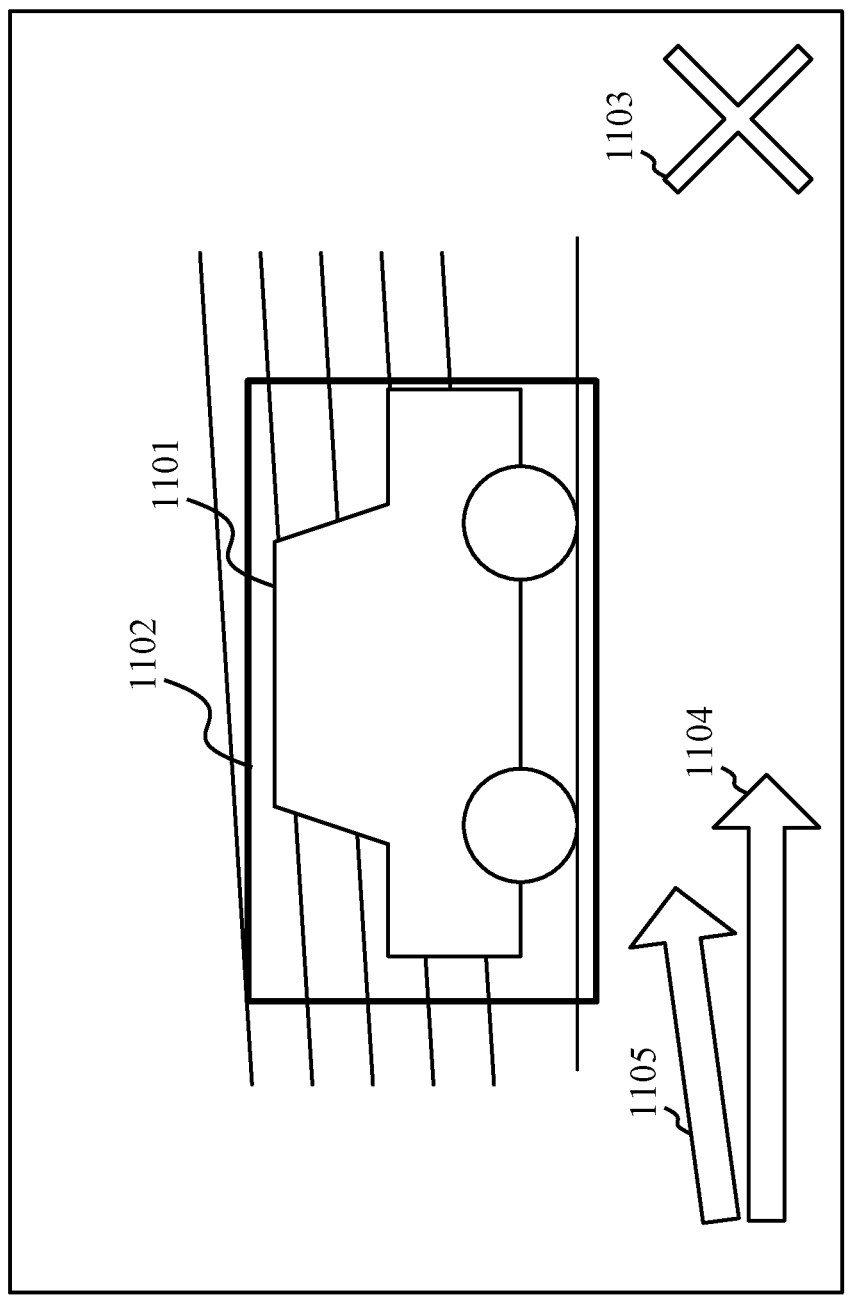
FIG. 11 illustrates illustrative captured images displayed on the camera body according to each embodiment.

Next, in the step S407, the system controller 130 controls the image processor 140 and prepares an image file based on the image data and the EXIF information. The system controller 130 stores the image data in the recorder 108 after storing the image data in the memory 107 via the memory controller 105. Next, in the step S408, the system controller 130 displays the image data stored in the memory 107 on the image display unit 106. In this case, the system controller 130 displays and superimposes on the image (image data) the image capturing condition, the follow-shot assist result, and the object position contained in the EXIF information of the image data. Referring now to FIG. 11, a description will be given of the display contents of the image display unit 106 later.

Due to the above processes, the result of the follow-shot assist provided to the exposure can be obtained from the interchangeable lens 200, and the follow-shot assist result is recorded in the obtained image data and displayed on the image display unit 106.

Figure 5:
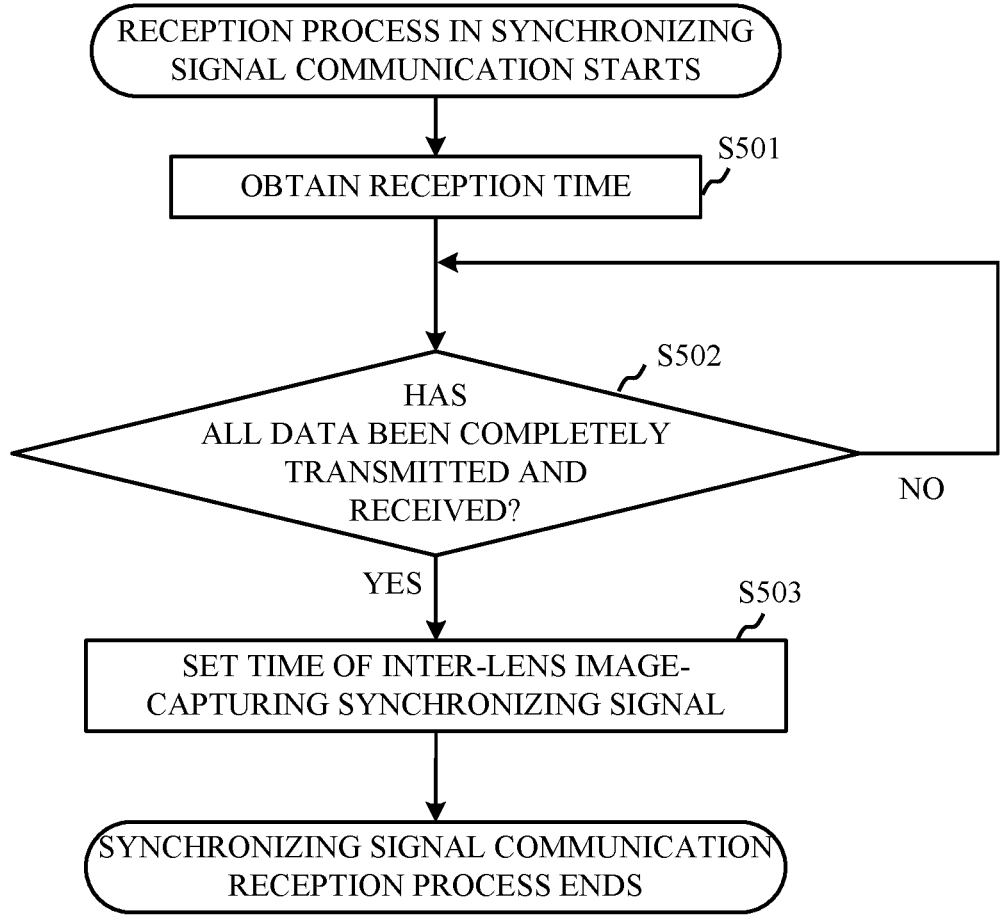
FIG. 5 is a flowchart of a reception process in a synchronizing signal communication by an interchangeable lens according to each embodiment.

Referring now to FIG. 5, a description will be given of a reception process in the synchronizing signal communication by the interchangeable lens 200. FIG. 5 is a flowchart of the reception process in the synchronizing signal communication by the interchangeable lens 200. FIG. 5 illustrates a process that starts when the interchangeable lens 200 compatible with the follow-shot assist receives the synchronizing signal communication from the camera body 100 in the live-view imaging mode.

Initially, in the step S501, the lens controller 210 stores a communication time by storing a current time of a free-run timer used for time control in the interchangeable lens 200. This time is stored in the unillustrated internal memory in the lens controller 210 or memory 212.

Next, in the step S502, the lens controller 210 determines whether a synchronizing signal with a predetermined communication data length has been communicated (whether all data are completely transmitted and received). Where all data has not yet been completely communicated (transmitted or received), the step S502 is repeated until all data is completely communicated. Where all data has been completely communicated, the flow moves to the step S503. In the step S503, the lens controller 210 subtracts the delay time contained in the reception data in the synchronizing signal communication (synchronizing signal delay time period) from the time stored in the step S501 (time when the communication started). Thereby, the time of the image-capturing synchronizing signal in the interchangeable lens 200 (inter-lens image-capturing synchronizing signal) can be calculated (set) which coincides with the image-capturing synchronizing signal in timing in the camera body 100.

Due to the above processes, the interchangeable lens 200 can recognize the inter-lens image-capturing synchronizing signal time that coincides with the image-capturing synchronizing signal timing in the camera body 100.

Figure 6:
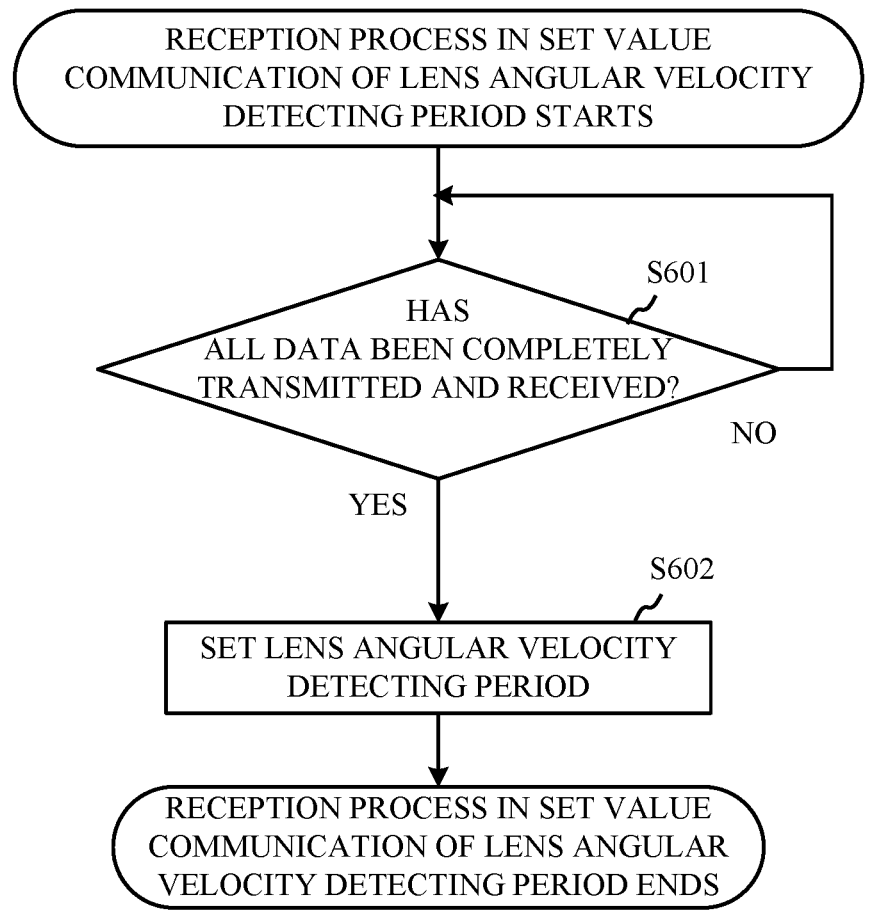
FIG. 6 is a flowchart of a reception process in a setting communication of a lens angular velocity detecting period by the interchangeable lens according to each embodiment.

Referring now to FIG. 6, a description will be given of a reception process in the set value communication of the lens angular velocity detecting period by the interchangeable lens 200. FIG. 6 is a flowchart of the reception process in the set value communication of the lens angular velocity detecting period by the interchangeable lens 200. FIG. 6 illustrates a process that starts when the interchangeable lens 200 compatible with the follow-shot assist receives the set value communication of the lens angular velocity detecting period from the camera body 100 in the live-view imaging mode.

Initially, in the step S601, the lens controller 210 determines whether the set value communication of predetermined lens angular velocity detecting period has been communicated with a communication data length (whether all data has been completely transmitted and received). Where all data has not yet been completely communicated (transmitted or received), the step S601 is repeated until all data is completely communicated. Where all data has been completely communicated, the flow moves to the step S602.

In the step S602, the lens controller 210 calculates the lens angular velocity detecting period based on the lens angular velocity detecting period contained in received data in the set value communication of the lens angular velocity detecting period and the time of the inter-lens image-capturing synchronizing signal calculated in the step S503. The lens controller 210 obtains the lens angular velocity in the lens angular velocity detecting period from the angular velocity detector 208. The lens controller 210 adds the angular velocity ID information contained in the set value communication of the lens angular velocity detecting period and the lens angular velocity information acquiring time to the lens angular velocity information, and stores the result in the internal memory or the memory 212. The lens controller 210 stores that the follow-shot assist is valid in the memory 212.

Due to the above processes, the interchangeable lens 200 can set the lens angular velocity detecting period that coincides with the motion vector detecting period in the camera body 100.

Figure 7:
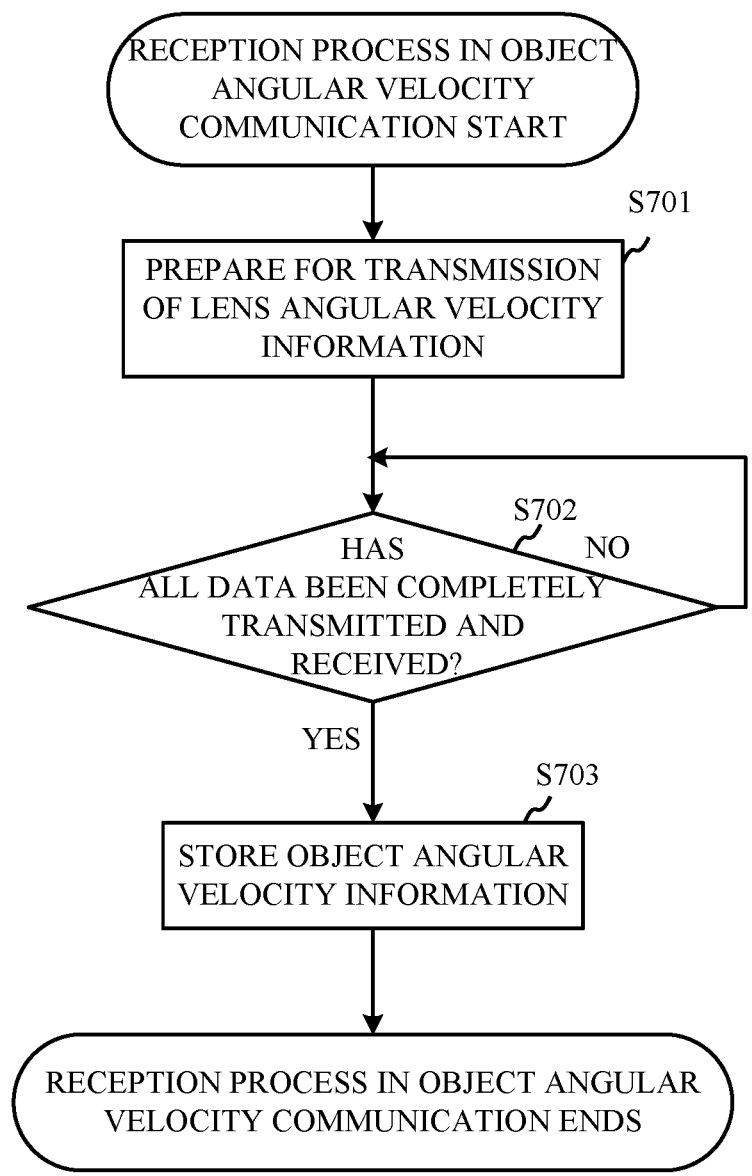
FIG. 7 is a flowchart of a reception process in an object angular velocity communication by the interchangeable lens according to each embodiment.

Referring now to FIG. 7, a description will be given of a reception process in an object angular velocity communication by the interchangeable lens 200. FIG. 7 is a flowchart of the reception process in the object angular velocity communication by the interchangeable lens 200. FIG. 7 illustrates a process that starts when the interchangeable lens 200 compatible with the follow-shot assist receives the object angular velocity communication from the camera body 100 in the live-view imaging mode.

Initially, in the step S701, the lens controller 210 prepares for or stores the lens angular velocity information in the transmission buffer so as to send the lens angular velocity information stored in the step S602 to the camera body 100. Next, in the step S702, the lens controller 210 determines whether the object angular velocity has been communicated with a predetermined communication data length (whether all data has been completely transmitted and received). Where all data has not yet been completely communicated (transmitted or received), the step S702 is repeated until all data is completely communicated. Where all data has been completely communicated, the flow moves to the step S703. In the step S703, the lens controller 210 stores the object angular velocity information in the internal memory or the memory 212 so as to prepare for the exposure start timing.

Due to the above processes, the interchangeable lens 200 can set the lens angular velocity detecting period that coincides with the motion vector detecting period of the camera body 100.

Figure 8:
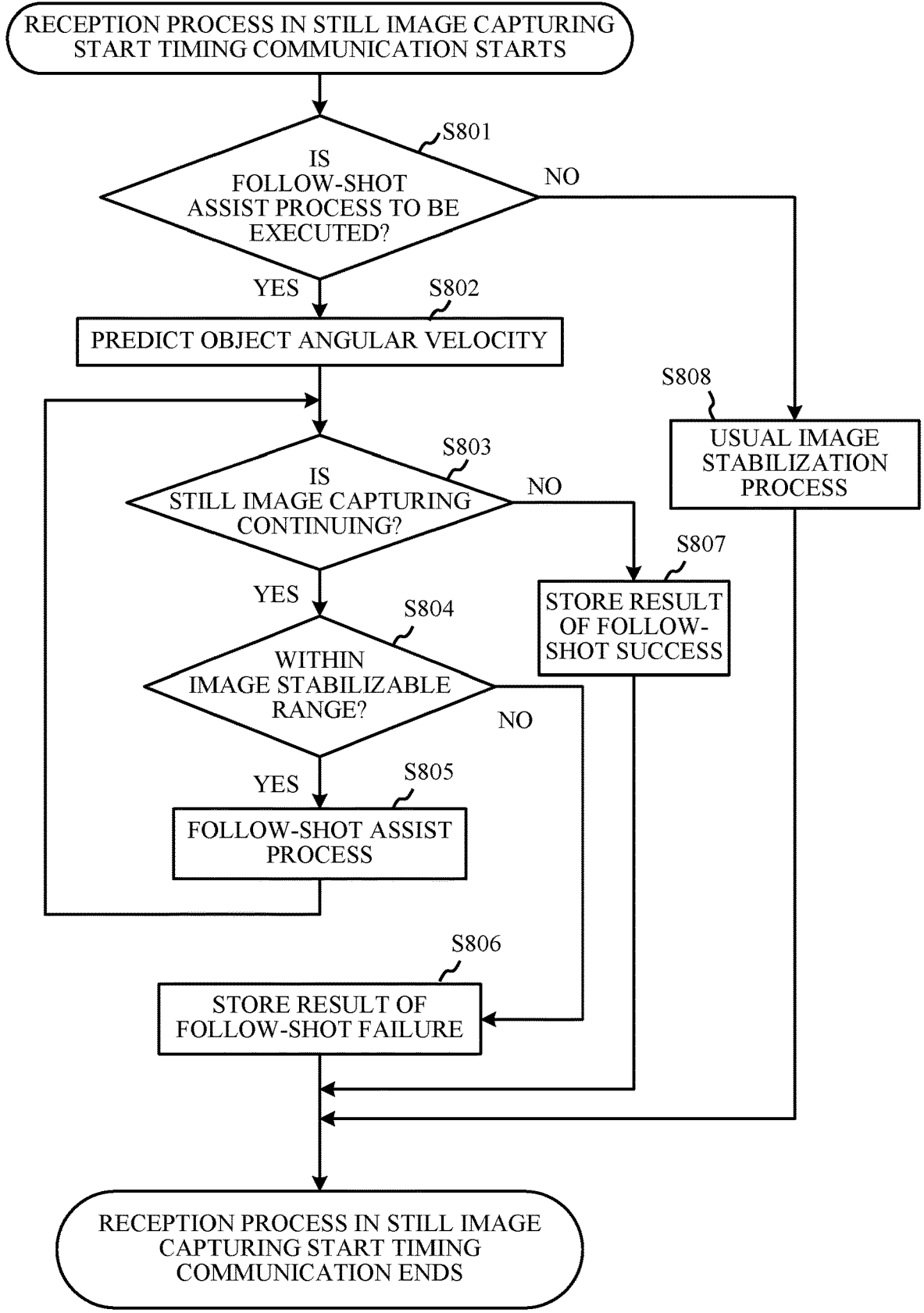
FIG. 8 is a flowchart of a reception process in a still image capturing start timing communication by the interchangeable lens according to a first embodiment.

Referring now to FIG. 8, a description will be given of a reception process in the still image capturing start timing communication by the interchangeable lens 200. FIG. 8 is a flowchart of the reception process in the still image capturing start timing communication in the interchangeable lens 200. FIG. 8 is a process that starts when the interchangeable lens 200 compatible with the follow-shot assist receives the still image capturing start timing communication from the camera body 100 in the live-view imaging mode in this embodiment.

Initially, in the step S801, the lens controller 210 determines whether still image capturing requires the follow-shot assist process. More specifically, the lens controller 210 makes the determination by referring to the area in the memory 212 written in the step S602. Where the follow-shot assist process is to be executed, the flow moves to the step S802. Where the follow-shot assist process is not to be executed, the flow moves to the step S808.

In the step S802, the lens controller 201 (predictor) predicts an object angular velocity at the current time based on the object angular velocity information stored in the step S703 and the current time (calculates the predicted angular velocity of the object before the still image is captured). The lens controller 210 makes a predictive calculation expressed by the following expression (1) where T is the current time, V is the object angular velocity at the current time T, v, a, and t are the object angular velocity, the object angular acceleration, and the lens angular velocity information acquiring time contained in the object angular velocity information, although the predictive calculation is not limited to the expression (1) and may use another expression or method.

$$V=v+a*(T-t) \quad (1)$$

Next, in the step S803, the lens controller 210 (image stabilizing controller) controls the image stabilizing controller 209 by using the angular velocity information of the object at the current time, and executes the follow-shot assist process. In other words, the lens controller 210 controls the image stabilization in capturing the still image by using the object angular velocity information calculated based on the angular velocity detected by the angular velocity detector 208, the motion vector detected by the motion vector detector 141. For example, the lens controller 210 performs a calculation as expressed in the following expression (2) where G is a follow-shot assist amount, and g is a panning amount detected by the angular velocity detector 208 in capturing the still image, although a calculation method of the follow-shot assist amount G is not limited to this example. The moving object can be maintained stationary by controlling the image stabilizing control lens 204 by a follow-shot assist amount in capturing the still image.

$$G=V-g \quad (2)$$

In the step S803, the lens controller 210 determines whether or not the still image capturing is continuing. More specifically, where the camera body 100 has not yet received the still image capturing end timing communication in the step S403, the lens controller 210 determines that the still image capturing is continuing. Where the still image capturing is continuing, the flow moves to the step S804. Where the still image is not captured, the flow moves to the step S807.

In the step S804, the lens controller 210 determines via the image stabilizing controller 209 whether or not the assist amount is within a movable range of the image stabilizing control lens 204 (whether the image stabilizing lens 204 exceeds the movable range or reaches an image stabilizing control end in capturing the still image). Where the assist amount is within the movable range of the image stabilizing control lens 204 (where the image stabilizing control lens 204 does not exceed the movable range), the flow moves to the step S805. When the image stabilizing control lens 204 is located outside the movable range (where the image stabilizing control lens 204 exceeds the movable range), the flow moves to the step S806.

In the step S805, the lens controller 210 executes the follow-shot assist process. More specifically, the lens controller 210 obtains a panning amount g from the angular velocity detector 208 and calculates the follow-shot assist amount G by using the expression (2). The lens controller 210 controls the image stabilizing control lens 204 by the follow-shot assist amount G via the image stabilizing controller 209. The lens controller 210 stores the follow-shot assist amount G and the panning amount g in the memory 212. After the step S805 is executed, the flow returns to the step S803.

In the step S806, the lens controller 210 stores a failure as the follow-shot assist result in the memory 212. The lens controller 210 calculates a follow-shot assist amount average value Ga and a panning amount average value ga as average values based on the object angular velocity V calculated in the step S802, the follow-shot assist amount G and the panning amount g stored in the step S805. The lens controller 210 stores the follow-shot assist amount average value Ga and the panning amount average value ga with the follow-shot assist result in the memory 212.

In the step S807, the lens controller 210 stores a success as the follow-shot assist result in the memory 212. The lens controller 210 calculates the follow-shot assist amount average value Ga and the panning amount average value ga as the average values based on the object angular velocity V calculated in the step S802 and the follow-shot assist amount G and the panning amount g stored in the step S805. The lens controller 210 stores the follow-shot assist amount average value Ga and the panning amount average value ga with the follow-shot assist result in the memory 212.

In the step S808, the lens controller 210 executes a normal image stabilization by the image stabilizing process only with the angular velocity (manual vibration amount) detected by the angular velocity detector 208.

Due to the above processes, the interchangeable lens 200 can send the result of the follow-shot assist provided to the still image capturing (exposure) to the camera body 100, and the camera body 100 can record the follow-shot assist result in the acquired image data.

Figure 9:
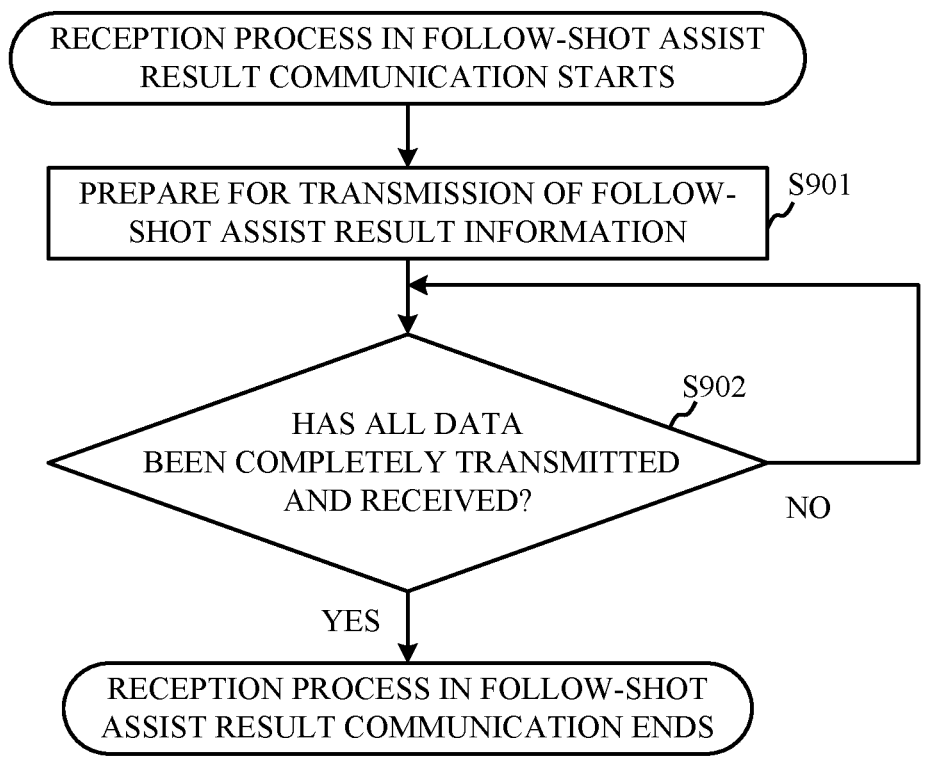
FIG. 9 is a flowchart of a reception process in a follow-shot assist result communication by the interchangeable lens according to each embodiment.

Referring now to FIG. 9, a description will now be given of a reception process in the follow-shot assist result communication by the interchangeable lens 200. FIG. 9 is a flowchart of the reception process in the follow-shot assist result communication by the interchangeable lens 200. FIG. 9 illustrates a process that starts when the interchangeable lens 200 compatible with the follow-shot assist receives the follow-shot assist result communication from the camera body 100 in the live-view imaging mode.

Initially, in the step S901, the lens controller 210 prepares for or stores the follow-shot assist result in the transmission buffer so as to send the follow-shot assist result, such as the object angular velocity predictively calculated in the step S802, to the camera body 100. Next, in the step S902, the lens controller 210 determines whether the object angular velocity has been communicated with a predetermined communication data length (whether all data has been completely transmitted and received). When all data has not yet been completely communicated (transmitted or received), the step S902 is repeated until all data is completely communicated. When all data has been completely communicated, the reception process of this flow ends.

Due to the above processes, the interchangeable lens 200 can send the follow-shot assist result, the object angular velocity V, the follow-shot assist amount average value Ga, and the panning amount average value ga to the camera body 100.

Figure 10:
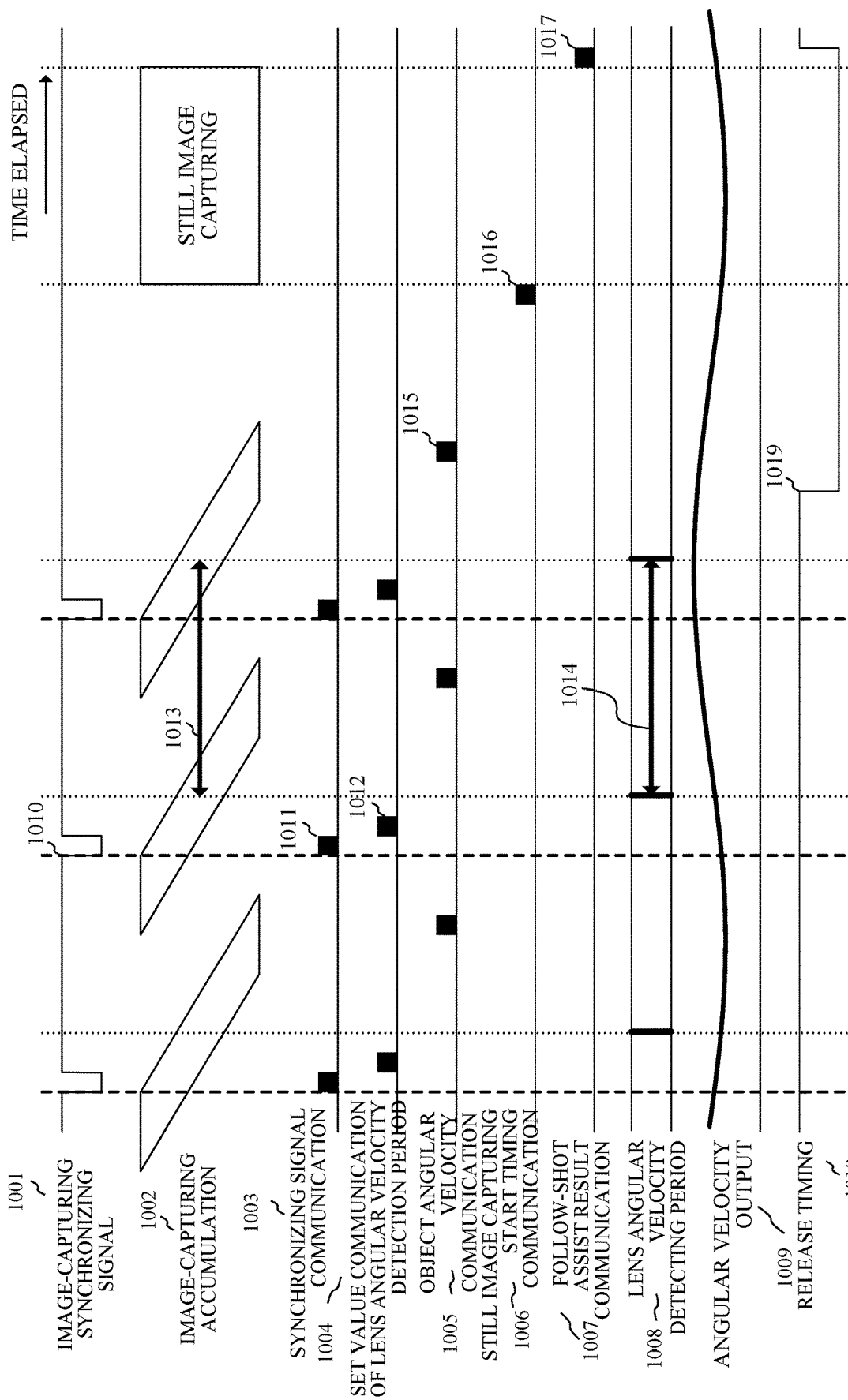
FIG. 10 is a timing chart of a follow-shot assist process by a camera system according to each embodiment.

Referring now to FIG. 10, a description will be given of the follow-shot assist process by the camera system 10 (that includes the camera body 100 and the interchangeable lens 200). FIG. 10 is a timing chart of the follow-shot assist process by the camera system 10. FIG. 10 illustrates a process timing of the camera system 10 in the follow-shot assist mode and the live-view imaging mode, where the attached interchangeable lens 200 is compatible with the follow-shot assist.

An image-capturing synchronizing signal 1001 is a synchronizing signal outputs from the timing generator 104. An image-capturing accumulation 1002 is an accumulation period in the image sensor 102, and the electric charges are read in order from the top on the image in response to the image-capturing synchronizing signal 1001. A synchronizing signal communication 1003 represents a timing of the synchronizing signal communication executed in the step S208 in FIG. 2. A set value communication of the lens angular velocity detecting period 1004 represents a timing of a set value communication of the lens angular velocity detecting period executed in the step S209 in FIG. 2.

An object angular velocity communication 1005 represents a timing in the object angular velocity communication executed in the step S307 in FIG. 3. A still image capturing start timing communication 1006 represents a timing for the still image capturing start timing communication executed in the step S401 in FIG. 4. A follow-shot assist result communication 1007 represents a timing for the follow-shot assist result communication executed in the step S405 in FIG. 4.

A release timing 1018 represents a timing when the photographer issues a release command via the shutter switch 116.

A lens angular velocity detecting period 1008 represents a lens angular velocity detecting period set in the step S602 in FIG. 6. When the lens angular velocity detecting period elapses, the lens controller 210 calculates the lens angular velocity corresponding to the period, adds the angular velocity ID information contained in the set value communication of the lens angular velocity detecting period and the lens angular velocity information acquiring time to the lens angular velocity information, and stores the result. An angular velocity output 1009 represents an output from the angular velocity detector 208. The lens controller 210 samples the angular velocity output 1009 in the lens angular velocity detecting period 1008.

In response to the image-capturing synchronizing signal 1010, the synchronizing signal communication 1011 starts and the lens controller 210 calculates the inter-lens image-capturing synchronizing signal time corresponding to the image-capturing synchronizing signal 1010. Thereafter, the set value of the lens angular velocity detecting period calculated so that the motion vector detecting period 1013 coincides with the lens angular velocity detecting period 1014 is sent to the interchangeable lens 200 by the set value communication of the lens angular velocity detecting period 1012. An object angular velocity communication 1015 notifies the camera body 100 of the lens angular velocity information obtained when the lens angular velocity detecting period 1014 ends. The follow-shot assist controller 134 calculates the object angular velocity information based on the lens angular velocity information and the motion vector information obtained in the motion vector detecting period 1013.

In response to a release timing 1019, the system controller 130 finishes the exposure associated with the synchronizing signal after the current exposure ends. The system controller 130 executes the still image capturing start timing communication 1016 after the still image capturing is prepared for the shutter 101 and the image sensor 102. At the same time, the shutter 101 is driven so as to start capturing a still image. When a shutter speed time instructed by the photographer elapses, the system controller 130 stops exposure by driving shutter 101. Thereafter, the system controller 130 executes the follow-shot assist result communication 1017.

Referring now to FIG. 11, a description will be given of a display method of a captured image in the step S408 in the live-view imaging mode where the attached interchangeable lens 200 is compatible with the follow-shot assist. FIG. 11 illustrates an illustrative captured image (still image) displayed on the image display unit 106 in the camera body 100 as a result of that the photographer follow-shots an object 1101 with the follow-shot assist.

The system controller 130 displays an object position frame 1102 (information on the object position in the still image) based on the object position stored in the EXIF information. The system controller 130 displays a follow-shot result 1103 (information on the image stabilizing control result) representing a success or failure of the follow-shot assist based on a follow-shot assist result stored in the EXIF information. Herein, the follow-shot result 1103 illustrates a failure of the follow-shot assist ("x" mark). When the follow-shot result 1103 illustrates a success of the follow-shot assist, a "○" mark is displayed representing the success. The follow-shot result 1103 is information, for example, representing whether the image stabilizing control lens 204 exceeds the movable range in capturing a still image (whether the image stabilizing control lens 204 reaches the image stabilizing control end).

The system controller 130 displays an object moving direction 1104 (information on the predicted angular velocity of the object) based on the object angular velocity V stored in the EXIF information. The system controller 130 displays a panning direction 1105 (information on an angular velocity in capturing a still image) based on the panning amount average value ga stored in the EXIF information. At this time, the object moving direction 1104 and the panning direction 1105 are displayed with arrow sizes proportional to the absolute value of the angular velocity. Since the object position is superimposed on the captured image and displayed, the photographer can confirm whether or not the follow-shot assist is applied to the object as intended by the photographer. Given a large shift between the object moving direction 1104 and the panning direction 1105, the photographer can recognize the panning direction and velocity to be corrected.

This embodiment displays the follow-assist result superimposed on the captured image on the image display unit 106 only for a predetermined time period after the image is captured. However, this embodiment is not limited to this example, and is applicable to a case where a captured image is read from the recorder 108 just after the image is captured.

While this embodiment discusses the object moving direction 1104 and the photographer panning direction 1105 superimposed on the captured image, the photographer may display a corrected direction of the panning direction based on the follow-shot assist amount average value Ga. The corrected direction of the panning direction coincides with a direction with the follow-shot assist amount G of 0.

Where the follow-shot capturing cannot provide a beautiful image, this embodiment can determine whether the photographer improperly panned the camera or the camera misapprehended the object. Where the photographer improperly panned the camera, the way of improving the panning direction can be fed back to the photographer.

Second Embodiment

Next follows a description of a second embodiment according to the present invention. The first embodiment suddenly stops the image stabilizing control lens 204 that has moved beyond the image stabilizing movable range in capturing a still image. On the other hand, this embodiment recalculates and reduces a follow-shot amount where the follow-shot assist amount G becomes large enough to exceed the image stabilizing movable range. In this embodiment, the configuration of the camera system, the control flow of the camera body 100, and part of the control flow of the interchangeable lens 200 are the same as those in the first embodiment. Thus, a description thereof will be omitted. This embodiment discusses a control flow of the still image capturing start timing communication different from that of the first embodiment among the control flows in the interchangeable lens 200.

Figure 12:
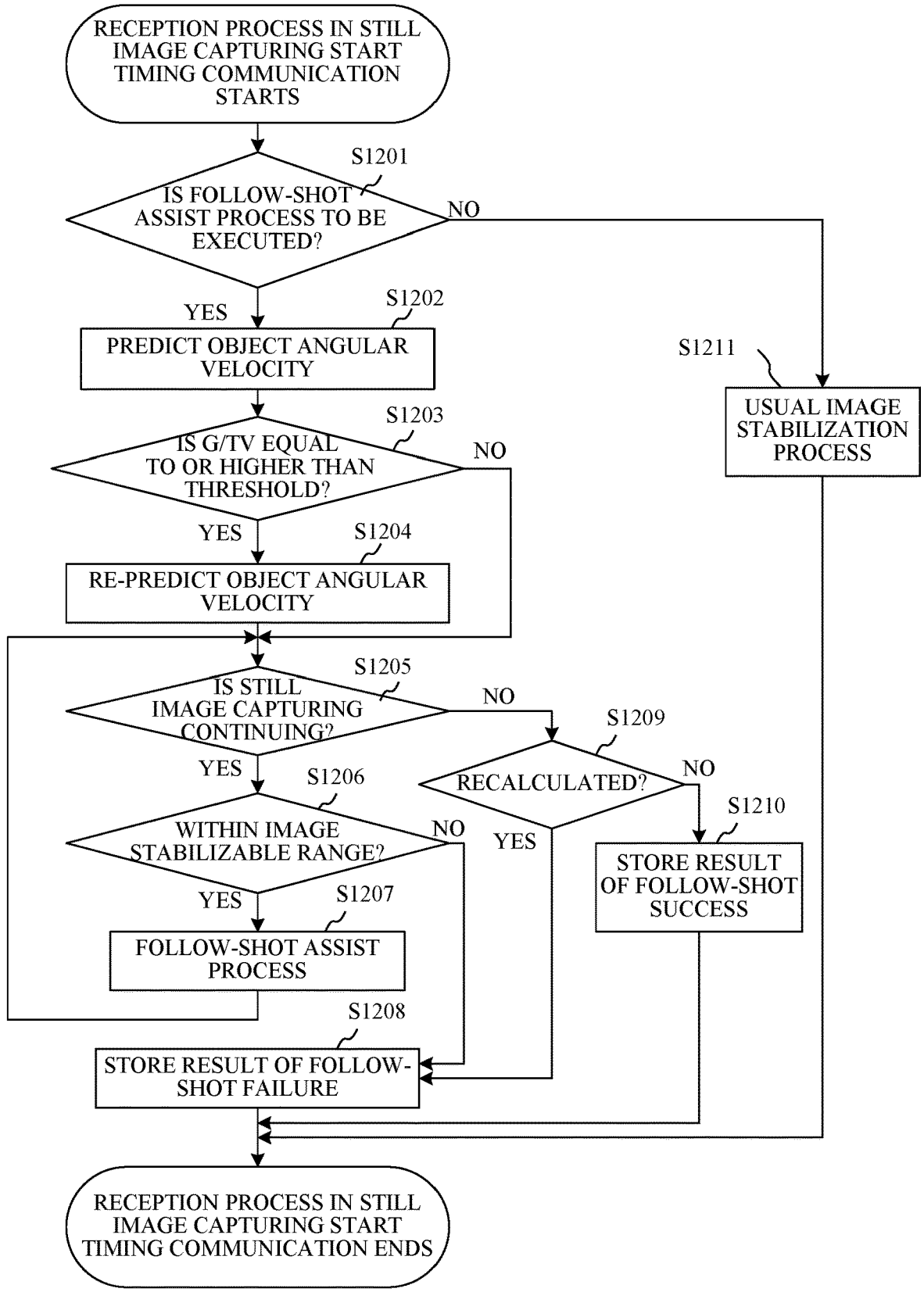
FIG. 12 is a flowchart of a reception process in a still image capturing start timing communication by the interchangeable lens according to a second embodiment.

Referring now to FIG. 12, a description will be given of a reception process in the still image capturing start timing communication by the interchangeable lens 200. FIG. 12 is a flowchart of the reception process in the still image capturing start timing communication by the interchangeable lens 200. FIG. 12 illustrates a process that starts when the interchangeable lens 200 compatible with the follow-shot assist receives the still image capturing start timing communication from the camera body 100 in the live-view imaging mode. FIG. 12 is different from FIG. 8 in having the steps S1203, S1204, and S1209. The steps S1201, S1202, S1205 to S1208, S1210, and S1211 in FIG. 12 are similar to the steps S801 to S808 in FIG. 8, and a description thereof will be omitted.

In the step S1203, the lens controller 210 confirms (determines) whether an inter-second follow-shot assist amount that is a value made by dividing an estimated follow-shot assist amount Gs by a shutter speed Tv is equal to or higher than a predetermined threshold. The estimated follow-shot assist amount Gs corresponds to the follow-shot assist amount G calculated with, for example, the expression (2). Where the inter-second follow-shot assist amount is equal to or higher than the predetermined threshold, the flow moves to the step S1204. Where the inter-second follow-shot assist amount is smaller than the predetermined threshold, the flow moves to the step S1205.

In the step S1204, the lens controller 210 recalculates the object angular velocity V using the following expression (3) so that the inter-second follow-shot assist amount becomes equal to or lower than the threshold Gb.

$$Gs/Tv=(g-V)/Tv<Gb \qquad (3)$$

In the step S1207, the lens controller 210 obtains the panning amount g from the angular velocity detector 208, and calculates the follow-shot assist amount G by using the expression (2). At this time, where the flow goes through the step S1204 (where the object angular velocity V is recalculated), the recalculated object angular velocity V is used.

In the step S1209, the lens controller 210 determines whether the flow has gone through the step S1204 (whether the object angular velocity V has been recalculated). Where the flow has gone through the step S1204, the flow moves to the step S1208. Where the flow has not gone through the step S1204, the flow moves to the step S1210.

Where the follow-shot assist amount G is large enough to exceed the image stabilizing movable range, this embodiment recalculates the object angular velocity so as to reduce the follow-shot assist amount and to feed back the follow-shot capturing result to the photographer. Where the follow-shot assist fails, the first embodiment suddenly stops the follow-shot assist control whereas this embodiment applies a moderate follow-shot assist control and restrains a still image from being unnaturally captured.

Third Embodiment

A camera system according to a third embodiment of the present invention is the same as that described in FIG. 1, and a description thereof will be omitted.

The image-capturing synchronizing communication process in the camera body 100 according this embodiment is the same as that illustrated in FIG. 2, and a description thereof will be omitted.

Figure 13:
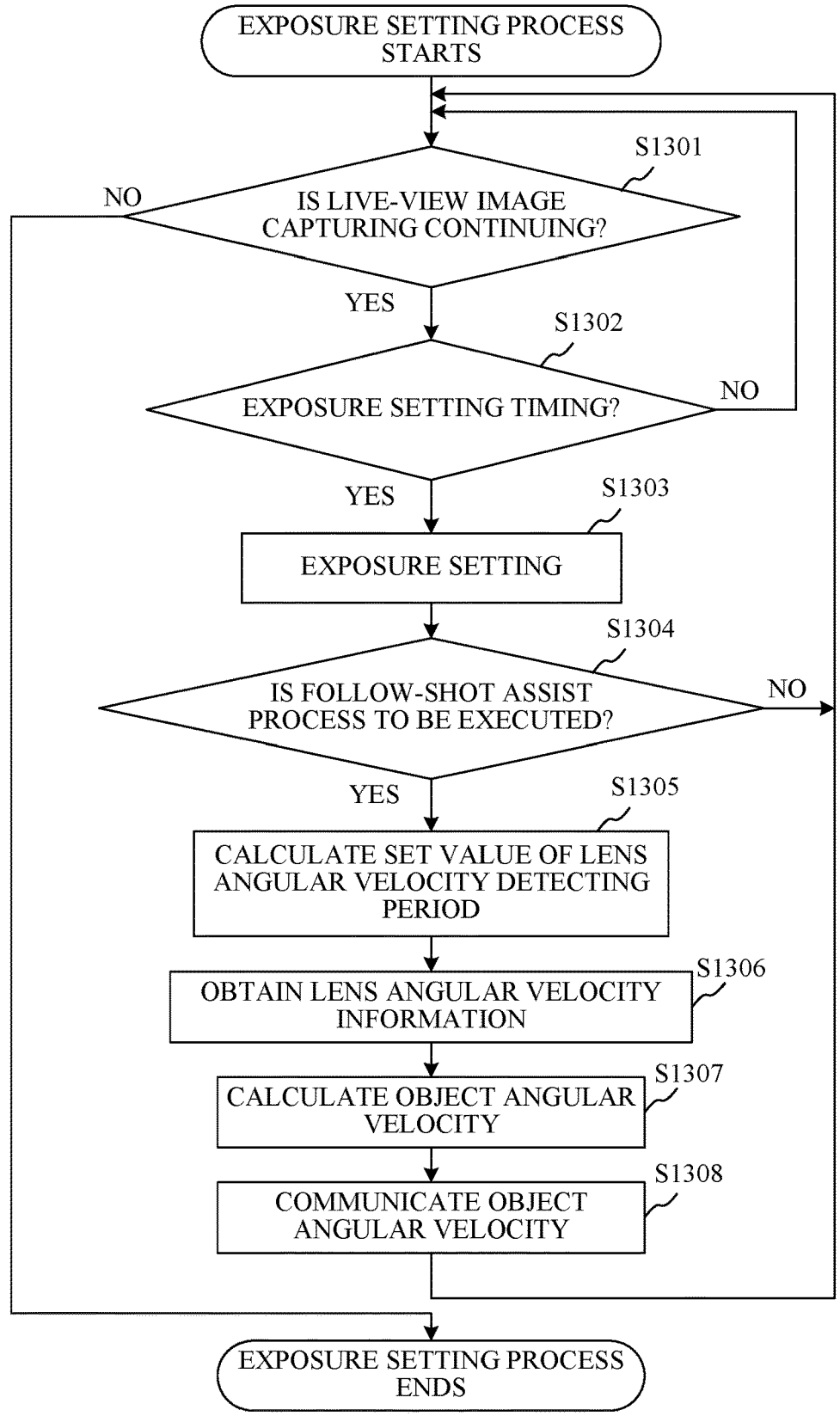
FIG. 13 is a flowchart of an exposure setting process by the camera body according to each embodiment.

Referring now to FIG. 13, a description will be given of an exposure setting process by the camera body 100. FIG. 13 is a flowchart of the exposure setting process by the camera body 100 in the live-view imaging mode, where the attached interchangeable lens 200 is compatible with the follow-shot assist. The exposure setting process starts for each frame in the live-view imaging mode and controls an exposure of the next frame.

In the step S1301, the system controller 130 determines whether the live-view imaging is continuing. Where the live-view imaging is continuing, the flow moves to the step S1302. Where the live-view imaging is not continuing, the exposure setting process of this flow ends.

In the step S1302, the system controller 130 determines whether it is an exposure setting timing of the image sensor 102 for the next frame. Where it is the exposure setting timing, the flow moves to the step S1303. Where it is not the exposure setting timing, the flow returns to the step S1301.

In the step S1303, the system controller 130 calculates an exposure set value based on an AE control amount, a camera mode, etc. The system controller 130 controls the exposure for the next frame by outputting the exposure set value to the memory controller 105. Next, in the step S1304, the follow-shot assist controller 134 determines whether the follow-shot assist process is to be executed. Where the interchangeable lens 200 is compatible with the follow-shot assist and the follow-shot assist mode is valid, the follow-shot assist controller 134 determines that the follow-shot assist process is to be executed and moves to the step S1305. Where the follow-shot assist controller 134 determines that the follow-shot assist process is not to be executed, the flow returns to the step S1301.

In the step S1305, the follow-shot assist controller 134 calculates the set value of the lens angular velocity detecting period as the relative time period from the image-capturing synchronizing signal so that the motion vector detecting period coincides with (corresponds to) the angular velocity detecting period based on the exposure setting for the next frame, etc. The set value of the calculated angular velocity detecting period is sent to the interchangeable lens 200 in the above step S209.

Next, in the step S1306, the follow-shot assist controller 134 obtains the angular velocity detected by the angular velocity detector 208 and the angular velocity detecting time information from the interchangeable lens 200 based on the set value of the lens angular velocity detecting period sent from the camera body 100 to the interchangeable lens 200. As described in FIG. 19A, the angular velocity information obtained in the step S1306 is the angular velocity information in the angular velocity detecting period that coincides with (corresponds to) the motion vector detecting period for the last frame. The follow-shot assist controller 134 receives (obtains) from the interchangeable lens 200 the angular velocity information (lens angular velocity) and the angular velocity detecting time information (lens angular velocity detecting time) correlated with each other. For example, as in communication commands illustrated in Table 1, the follow-shot assist controller 134, such as the lens communication controller 133 and the I/F 120, receives (obtains) the lens angular velocity and the lens angular detecting time from the same communication packet. In other words, the lens controller 210 (I/F 220) sends the lens angular velocity and the lens angular velocity detecting time through the same communication packet.

TABLE 1

| DCL | 0xAA (lens angular velocity communication command) | Don't care | Don't care |
|---|---|---|---|
| DLC | Don't Care | Lens angular velocity | Lens angular velocity detecting time |

Next, in the step S1307, the follow-shot assist controller 134 calculates the angular velocity information of the object (containing the object angular velocity and the object angular acceleration). The object angular velocity information is calculated based on the angular velocity information obtained from the interchangeable lens 200 in the step S1306, the angular velocity detecting time information, the lens information, such as a focal length, the motion vector amount input from the image processor 140, etc. The follow-shot assist controller 134 outputs the calculated object angular velocity information to the lens communication controller 133.

Next, in the step S1308, the lens communication controller 133 executes the object angular velocity communication so as to send the object angular velocity information to the interchangeable lens 200. In this embodiment, the follow-shot assist controller 134 (lens communication controller 133) sends the object angular velocity information correlated with the angular velocity information acquiring time obtained from the interchangeable lens 200 in the step S1306, to the interchangeable lens 200. The follow-shot assist controller 134 in this case sends the object angular velocity information (object angular velocity) and the angular velocity detecting time information (lens angular velocity detecting time) correlated with each other, to the interchangeable lens 200. For example, as in communication commands illustrated in table 2, the follow-shot assist controller 134 sends the object angular velocity and the lens angular velocity detecting time period from the same communication packet. In other words, the lens controller 210 (I/F 220) receives (obtains) the object angular velocity and the lens angular velocity detecting time through same communication packet.

TABLE 2

| DCL | 0xBB (object angular velocity communication command) | Object angular velocity | Lens angular velocity detecting time |
|---|---|---|---|
| DLC | Don't care | Don't care | Don't care |

When the object angular velocity communication in the step S1308 ends, the flow returns to the step S1301.

Due to the above processes, the exposure for the next frame can be controlled, and the next image-capturing synchronizing signal can set the lens angular velocity detecting period to be notified to the interchangeable lens 200. This embodiment can notify the interchangeable lens 200 of the object angular velocity, and obtain the angular velocity information from the interchangeable lens 200.

Referring now to FIG. 14, a description will be given of an exposure process by the camera body 100. FIG. 14 is a flowchart of the exposure process by the camera body 100. FIG. 14 illustrates an operation of a live-view exposure process in the camera body 100 in the live-view imaging mode, where the attached interchangeable lens 200 is compatible with the follow-shot assist. The live-view exposure process starts with the exposure start command via the shutter switch 116 (SW2) in the live-view imaging mode.

Initially, in the step S1401, the system controller 130 notifies the interchangeable lens 200 of the exposure start timing (image-capturing start timing) via a communication with the lens communication controller 133. Next, in the step S1402, the system controller 130 controls the shutter controller 110 and the image sensor 102, executes the exposure process, and obtains image data. The image data is stored in the memory 107 via the image processor 140 and the memory controller 105.

Next, in the step S1403, the lens communication controller 133 determines whether the follow-shot assist process is to be executed. Where the interchangeable lens 200 is compatible with the follow-shot assist and the follow-shot assist mode is valid, the lens communication controller 133 determines that the follow-shot assist mode is to be executed and moves to the step S1404. Where the follow-shot assist process is not to be executed, the flow moves to the step S1405.

In the step S1404, the lens communication controller 133 executes the communication so as to receive the follow-shot assist result information from the interchangeable lens 200. In the step S1405, the system controller 130 prepares EXIF information to be added to an image file. The EXIF information is recorded in the memory 107 via the memory controller 105. In this embodiment, the EXIF information contains an image capturing condition (camera mode), such as lens information, a shutter speed, and an F-number, and the follow-shot assist result information received in the step S1404.

Next, in the step S1406, the system controller 130 controls the image processor 140 and prepares the image file based on the image data and the EXIF information. The system controller 130 stores the image data in the memory 107 via the memory controller 105, and records the image data in the recorder 108.

Due to the above processes, the result of the follow-shot assist performed in the exposure can be obtained from the interchangeable lens 200, and the follow-shot assist result can be recorded in the obtained image data or displayed on the image display unit 106.

When the set value of the lens angular velocity detecting period is sent from the camera body 100 to the interchangeable lens 200, the motion vector detection period of the camera body 100 can coincide with the angular velocity detecting period of the interchangeable lens 200 in timing. The angular velocity information detected by the interchangeable lens 200 is tagged (or correlated) with the detecting time of the angular velocity information and sent to the camera body 100. The detecting time of the angular velocity information is tagged (or correlated) with the object angular velocity information calculated based on the angular velocity information and the motion vector detecting information, and sent to the interchangeable lens 200. Thereby, in the live-view release exposure process, which will be described later, the image stabilizing controller 209 can be controlled so as to correctly control a moving amount of the object in exposure. In other words, the proper correction is available even though a live-view release exposure process is requested while the transmission of the angular velocity information to the camera body 100 and the transmission process of the angular velocity information of the object from the camera body 100 have not yet been completed. The proper correction is available even though the live-view release exposure process is requested while the follow-shot assist communication has not yet been completed at the conceived timing.

Since a reception process in the synchronizing signal communication by the interchangeable lens 200 is the same as that described with reference to FIG. 5, a description thereof will be omitted.

Referring now to FIG. 15, a description will be given of a reception process in the set value communication of the lens angular velocity detecting period by the interchangeable lens 200. FIG. 15 is a flowchart of the reception process in the set value communication of the lens angular velocity detecting period by the interchangeable lens 200. FIG. 15 is a process that starts when the interchangeable lens 200 compatible with the follow-shot assist receives the set value communication of the lens angular velocity detecting period from the camera body 100 in the live-view imaging mode.

Initially, in the step S1501, the lens controller 210 determines whether the set value communication of the predetermined lens angular velocity detecting period has been communicated with a communication data length (whether all data has been completely transmitted and received). When all data has been completely communicated (transmitted and received), the step S1501 is repeated until all data is completely communicated. When all data has been completely communicated, the flow moves to the step S1502.

In the step S1502, the lens controller 210 sets the lens angular velocity detecting period based on the lens angular velocity detecting period contained in the received data in the set value communication of the lens angular velocity detecting period and the time of the inter-lens image-capturing synchronizing signal calculated in the step S503. In other words, the lens controller 210 obtains the angular velocity in the lens angular velocity detecting period from the angular velocity detector 208 when the lens angular velocity detecting period (the period which the angular velocity detector 208 detects the angular velocity) ends.

Next, in the step S1503, the lens controller 210 stores time information (lens angular velocity detecting time) when the angular velocity detector 208 detects the angular velocity. The lens angular velocity detecting time is stored, for example, in the (unillustrated) internal memory in the lens controller 210 or the memory 212. More specifically, the lens controller 210 stores the current time in the free-run timer used to control time in the interchangeable lens 200. The stored time (time information) may be the central time in the period designated by the set value of the lens angular velocity detecting period sent from the camera body 100. However, this embodiment is not limited to this example, and may be the start time or end time in that period designated by the set value of the lens angular velocity detecting period.

Due to the above processes, the interchangeable lens 200 can set the lens angular velocity detecting period that coincides with the motion vector detecting period in the camera body 100.

Figures 16, 17:
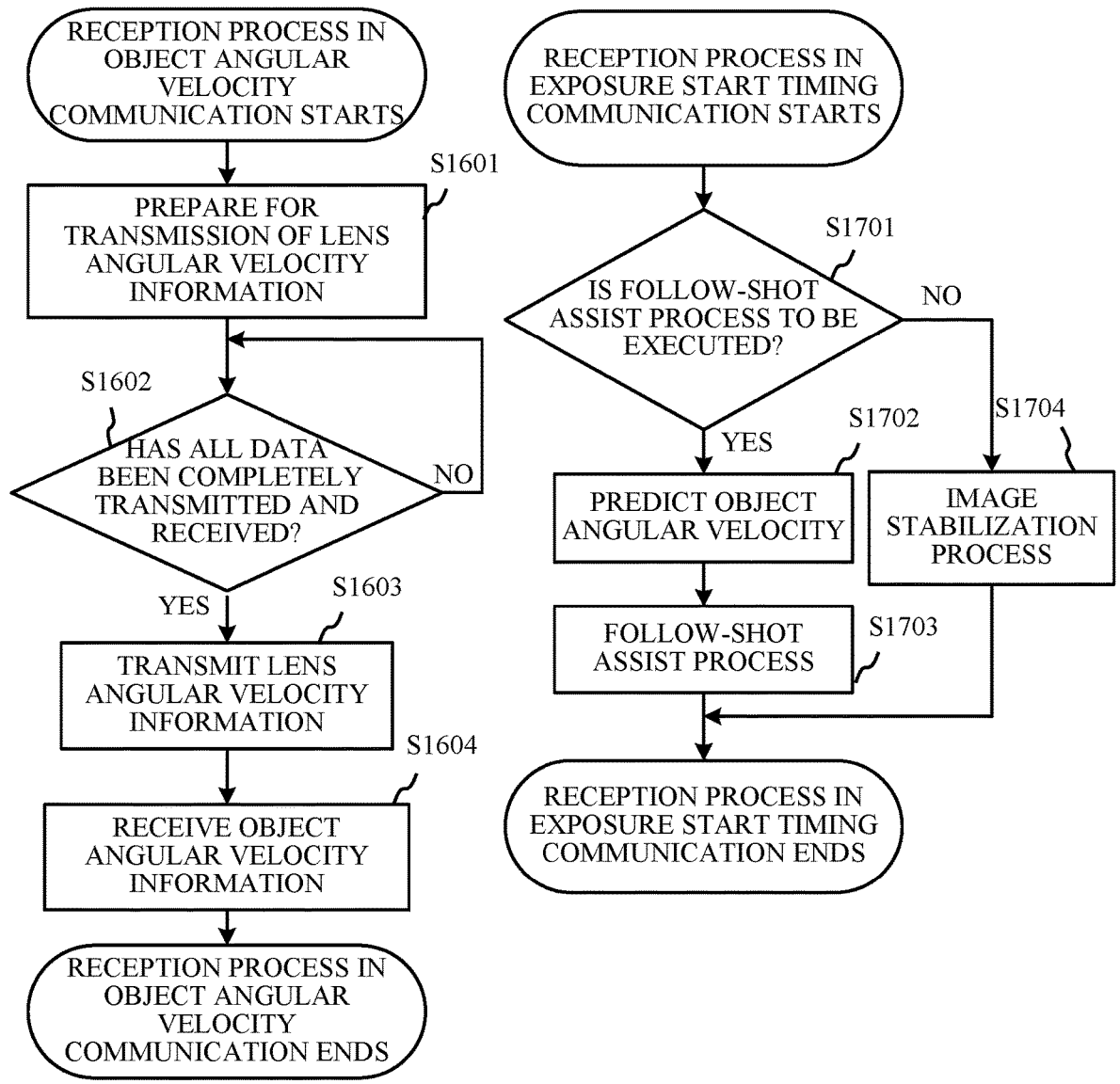
FIG. 16 is a flowchart of a reception process in an object angular velocity communication by the interchangeable lens according to each embodiment.
FIG. 17 is a flowchart of a reception process in an exposure start timing communication by the interchangeable lens according to each embodiment.

Referring now to FIG. 16, a description will be given of a reception process in the object angular velocity communication by the interchangeable lens 200. FIG. 16 is a flowchart of the reception process of the object angular velocity communication by the interchangeable lens 200. FIG. 16 is a process that starts when the interchangeable lens 200 compatible with the follow-shot assist receives the object angular communication from the camera body 100 in the live-view imaging mode.

Initially, in the step S1601, the lens controller 210 sends the angular information (lens angular velocity) stored in the step S1602 and the angular velocity detecting time information (lens angular velocity detecting time) stored in the step S1603 to the camera body 100. Hence, the lens controller 210 stores the information (data) in the transmission buffer.

Next, in the step S1602, the lens controller 210 determines whether the object angular velocity communication has been communicated by a predetermined communication data length (whether all data has been completely transmitted and received). When all data has not yet been completely communicated (transmitted and received), the step S1602 is repeated until all data is completely communicated. When all data has been completely communicated, the flow moves to the step S1603.

Next, in the step S1603, the lens controller 210 sends the angular velocity information prepared in the step S1601 and the angular velocity detecting time information to the camera body 100. Next, in the step S1604, the lens controller 201 stores the object angular velocity information and the angular velocity detecting time information in the follow-shot assist controller 134 so as to prepare for a request for a live-view release exposure process from the camera body 100. As described later with reference to FIG. 19A, when the lens angular velocity detecting time received from the camera body 100 in the step S1603 is the angular velocity detecting time information sent to the camera body 100 correlated with the angular velocity information stored in the step S1503 in the interchangeable lens 200.

The interchangeable lens 200 sends the detecting time of the angular velocity information to the camera body 100 and the camera body 100 again sends it to the interchangeable lens 200 because a series of communication processes in which the interchangeable lens 200 sends the angular velocity information to the camera body 100 and the camera body 100 sends the object angular velocity information to the interchangeable lens 200 are not synchronized with the live-view release exposure process. Even when the series of communication processes have not yet been completed, it is necessary to implement the follow-shot assist operation in the live-view release exposure process. The configuration of this embodiment can guarantee that the object angular velocity information used to calculate a drive amount by which the image stabilizing controller 209 corrects the moving amount of the object in exposure is synchronized with the lens angular velocity detecting time as the predicted reference time. An unusual case will be described later where the object angular velocity information may not be synchronized with the lens angular velocity detecting time as the predicted reference time will be described with reference to a timing chart.

This embodiment describes the lens angular velocity information communication sent from the interchangeable lens 200 to the camera body 100 and the object angular velocity information sent from the camera body 100 to the interchangeable lens 200 as separate communication processes, but is not limited to this example. This embodiment may define a data format as a full duplex communication and execute one communication process.

Due to the above processes, the interchangeable lens 200 can set the lens angular velocity detecting period that coincides with the motion vector detecting period of the camera body 100, and can obtain the object angular velocity information from the camera body 100.

Referring now to FIG. 17, a description will be given of a reception process in the exposure start timing communication by the interchangeable lens 200. FIG. 17 is a flowchart of the reception process in the exposure start timing communication by the interchangeable lens 200. FIG. 17 illustrates a process that starts when the interchangeable lens 200 compatible with the follow-shot assist receives the exposure start timing communication from the camera body 100 in the live-view imaging mode.

Initially, in the step S1701, the lens controller 210 determines whether or not the exposure requires the follow-shot assist process. For example, the lens controller 210 makes this determination by referring to the area in the memory 212 written in the step S1502. When the follow-shot assist process is to be executed, the flow moves to the step S1702. When the follow-shot assist is not to be executed, the flow moves to the step S1704.

In the step S1702, the lens controller 210 (calculator) predicts the object angular velocity at current time based on the object angular velocity information stored in the step S1603 and the angular velocity detecting time information. In other words, the lens controller 210 calculates a predicted angular velocity of the object. The lens controller 210 performs a predictive calculation as expressed by the expression (1) where T is the current time and V is an object angular velocity at the current time T.

In the expression (1), "v" is an object angular velocity (object angular velocity information) sent from the interchangeable lens 200 to the camera 100 in the step S1603 and obtained by the camera body 100 in the step S306, "a" is an object angular acceleration (object angular acceleration information) obtained by the camera body 100 in the step S306, and "t" is an angular velocity information acquiring time (lens angular velocity information acquiring time) obtained by the camera body 100 in the step S1306. However, the predictive calculation is not limited to the expression (1), and may use another expression or another method.

Next, in the step S1703, the lens controller 210 controls the image stabilizing controller 209 by using the object angular velocity V at the current time, and executes the follow-shot assist process. For example, the lens controller 210 obtains the image stabilizing amount (panning amount) g from the angular velocity detector 208 and calculates the follow-shot assist image stabilizing amount G with the expression (2), although the calculation method of the follow-shot assist amount G is not limited to this calculation. The moving object can be maintained stationary by controlling the image stabilizing control lens 204 so as to cancel out the follow-shot assist image stabilizing amount in exposure.

In the step S1704, the lens controller 210 performs an image stabilizing process (image stabilizing control) only with an image stabilizing amount from the angular velocity detector 208, and thereby performs a usual image stabilizing correction.

Due to the above processes, the interchangeable lens 200 can send the result of the follow-shot assist performed in exposure to the camera body 100, and the camera body 100 can record the acquired image data in the follow-shot assist result.

A reception process in the follow-shot assist result communication by the interchangeable lens 200 is the same as that described in FIG. 9, and a description thereof will be omitted.

Due to the processes in FIG. 9, the interchangeable lens 200 can obtain the object angular velocity that reflects the time elapsed from when the lens angular velocity detecting time is obtained to when the exposure starts, and can perform an accurate follow-shot assist.

Referring now to FIG. 18A, a description will be given of the camera system 10 (that includes the camera body 100 and the interchangeable lens 200). FIG. 18A is a timing chart of a follow-shot assist process by the camera system 10. FIG. 18A illustrates a process timing in the camera system 10 in the follow-shot assist mode and the live-view imaging mode, where the attached interchangeable lens 200 is compatible with the follow-shot assist.

An image-capturing synchronizing signal 2001 is a synchronizing signal output from the timing generator 104. An image-capturing accumulation 2002 represents an accumulation period in the image sensor 102, and the electric charges are read in order from the top on the image in response to the image-capturing synchronizing signal 2001. A synchronizing signal communication 2003 represents a timing of the synchronizing signal communication in the step S208 in FIG. 2. A set value communication 2004 in the lens angular velocity detecting period represents a timing for a set value communication in the lens angular velocity detecting period in the step S209 in FIG. 2.

A lens angular velocity communication 2005 represents a timing in the lens angular velocity communication in the step S1603 in FIG. 16. An object angular velocity communication 2006 represents a timing in the object angular velocity communication in the step S1604 in FIG. 16. An exposure timing communication 2007 represents a timing for the follow-shot assist result communication in the step S1401 in FIG. 14. A lens angular velocity detecting period 2008 represents a lens angular velocity detecting period set in the step S1502 in FIG. 15. When the lens angular velocity detecting period ends, the lens angular velocity corresponding to this period is calculated and the lens angular velocity information tagged or correlated with the lens angular velocity information acquiring time is stored.

An angular velocity output 2009 represents an output from the angular velocity detector 208. The lens controller 210 samples the angular velocity output 2009 in the lens angular velocity detecting period 2008. An object movement correcting amount prediction 2010 in the follow-shot assist exposure represents reference time (or lens angular velocity information acquiring time t) in a process executed in the step S1702 in FIG. which calculates the drive amount of the image stabilizing controller 209 with a predictive expression so as to correct the object moving amount in exposure. A follow-shot assist correction process 2011 represents a control period in the image stabilizing controller 209 executed in the step S1703 in FIG. 17.

A description will now be given of a basic sequence for a follow-shot assist process in a live-view release exposure process. For example, in response to the image-capturing synchronizing signal 2012, a synchronizing signal communication 2013 is executed and the lens controller 210 calculates the inter-lens image-capturing synchronizing signal time that coincides with the image-capturing synchronizing signal 2012. Thereafter, a set value communication of the lens angular velocity detecting period 2014 is executed. Thereby, the set value of the lens angular velocity detecting period 2015 is sent to the interchangeable lens 200 as time information corresponding to the motion vector detecting time period and the start timing of the motion vector detecting period 2016 in the camera body 100. The lens controller 210 sets the lens angular velocity detecting period 2017. The lens controller 210 stores time information of the center of gravity time in the lens angular velocity detecting period 2017 as the lens angular velocity detecting time. A lens angular velocity communication 2018 notifies the camera body 100 of the lens angular velocity detecting time and the lens angular velocity information obtained after the lens angular velocity detecting period 2017 ends.

The camera body 100 when receiving the lens angular velocity information generates the object angular velocity information based on the motion vector information detected in the motion vector detecting period 2016 and the lens angular velocity information received from the interchangeable lens 200. An object angular velocity communication 2019 notifies the camera body 100 of the generated lens angular velocity information. The camera body 100 repeats the above processes and continues to send the accurate object angular velocity information to the interchangeable lens 200, unless the photographer requests the live-view release exposure process.

A description will now be given of a live-view release exposure process when the photographer presses the shutter switch 116 at a timing of a live-view release exposure process request 2020. Reference numeral 2021 denotes the live-view release exposure process for still image capturing. The camera body 100 executes an exposure timing communication 2023 at a timing a predetermined time period 2022 before the live-view release exposure process 2021. Thereby, the camera body 100 sends a start timing for the live-view release exposure process for still image capturing to the interchangeable lens 200. While the communication process notifies the exposure timing, the timing notifying method is not limited to the communication.

When receiving the exposure timing communication 2007, the follow-shot assist controller 134 calculates a moving amount of the object in the live-view release exposure process or a correction amount to drive the image stabilizing controller 209 in exposure, in a period 2024. The calculation expression as used herein is the expression (1) described with reference to the step S1702 in FIG. 17. In the expression (1), the current position T corresponds to the exposure start timing time, which is the time made by adding the predetermined time period 2022 from the reception time of the exposure timing communication 2007 to the exposure start. In addition, "v" is lens angular velocity information obtained in the lens angular velocity detecting period 2017, "a" is an object angular velocity of which the object angular velocity communication 2019 notifies the interchangeable lens 200, and "t" is lens angular velocity information acquiring time 2025. The image stabilizing controller 209 is moved in a live-view release exposure process period 2027 so as to correct a moving amount of the object in a period illustrated by a broken line 2026. A description will be given of a method of calculating a follow-shot correction amount in the described live-view release exposure process, with reference to FIG. 19.

In order to realize the follow-shot assist function, the object angular velocity information is generated based on the angular velocity detecting information of the interchangeable lens 200 and the motion vector detecting information of the camera body 100, and the object angular velocity information is sent to the interchangeable lens 200. Thereby, in response to the live-view release exposure process request 1020, a correcting amount by which the object moved up to the exposure can be calculated.

Figure 18B:
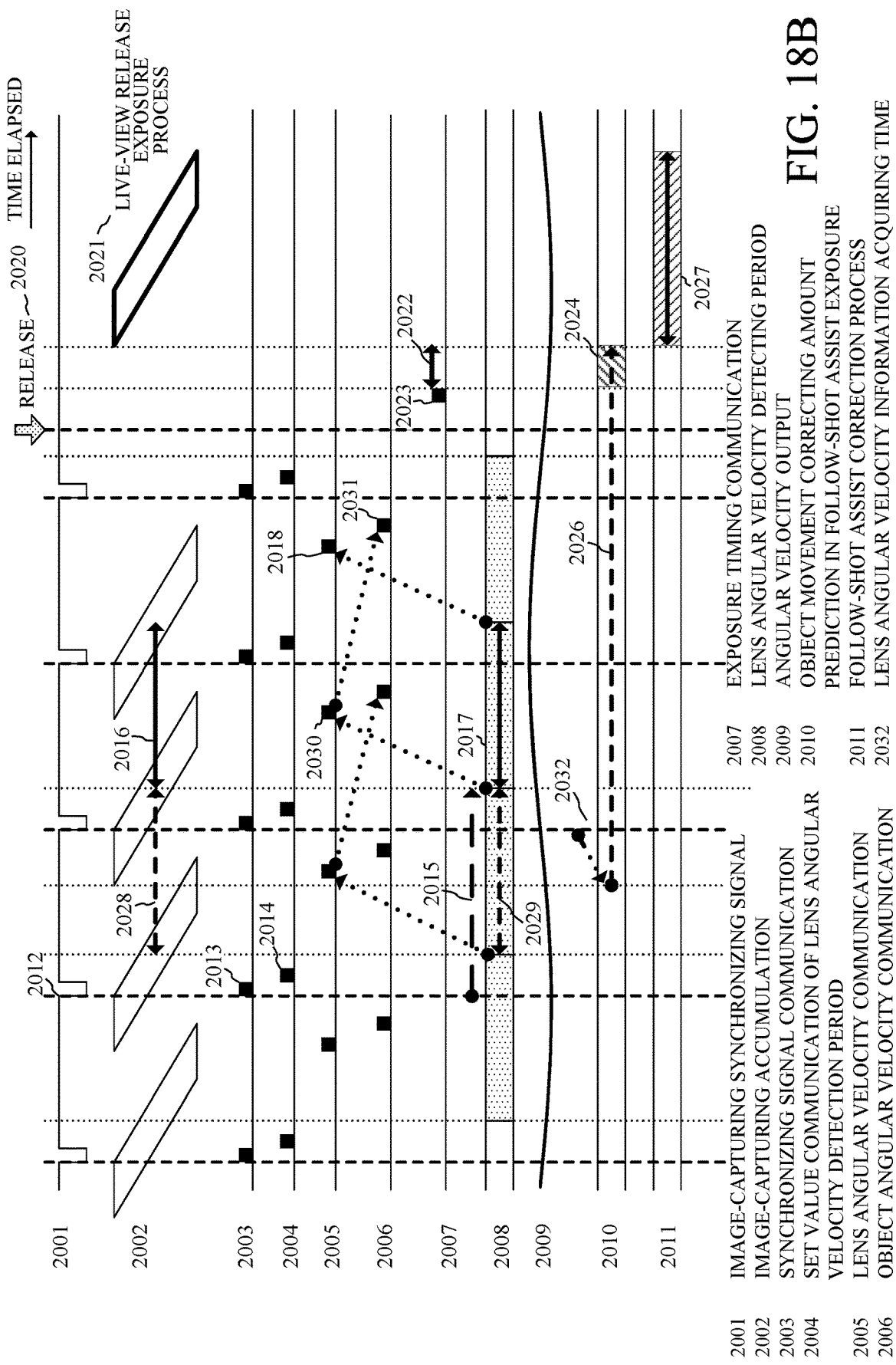

FIG. 18A illustrates that the live-view release exposure process request 1020 occurs when a series of information exchanges between the camera body 100 and the interchangeable lens 200 are completed. Referring now to FIG. 18B, a description will be given of a case where the live-view release exposure process request occurs before the object angular velocity information is transmitted from the camera body 100 to the interchangeable lens 200.

In FIG. 18B, reference numerals 2001 to 2018 are the same as reference numerals 2001 to 2018 in FIG. 18A, and the lens angular velocity communication 2018 notifies the camera body 100 of the lens angular velocity information and the lens angular velocity detecting time.

The camera body 100 sends the object angular information to the interchangeable lens 200 based on the motion vector information detected in the motion vector detecting period 2016 and the angular velocity information detected in the lens angular velocity detecting period 2017. In FIG. 18B, the live-view release exposure process request 2020 occurs before the object angular velocity information is communicated. In this case, the follow-shot assist process in the live-view release exposure process request 2020 is performed based on information in the last image-capturing synchronizing signal. In other words, the interchangeable lens 200 notifies the camera body 100 of the lens angular velocity information and the lens angular velocity detecting time through a lens angular velocity communication 2030 based on the angular velocity information detected in a lens angular velocity detecting period 2029 illustrated by a broken line. The camera body 100 generates motion vector information detected in a motion vector detecting period 2028 illustrated by a broken line and angular velocity information detected in the lens angular velocity detecting period 2029 illustrated by a broken line. The camera body 100 notifies the interchangeable lens 200 of the generated object angular velocity information through an object angular velocity communication 2031. At this time, a lens angular velocity detecting time 2032 is stored in the object angular velocity communication 2031. Thus, the follow-shot assist controller 134 does not have to store the lens angular velocity information acquiring time for each image-capturing synchronizing signal process. In other words, the follow-shot assist controller 134 can calculates the drive amount for the image stabilizing controller 209 in the live-view release exposure process with the expression (1) and only information received in the object angular velocity communication 2031.

Figure 18C:
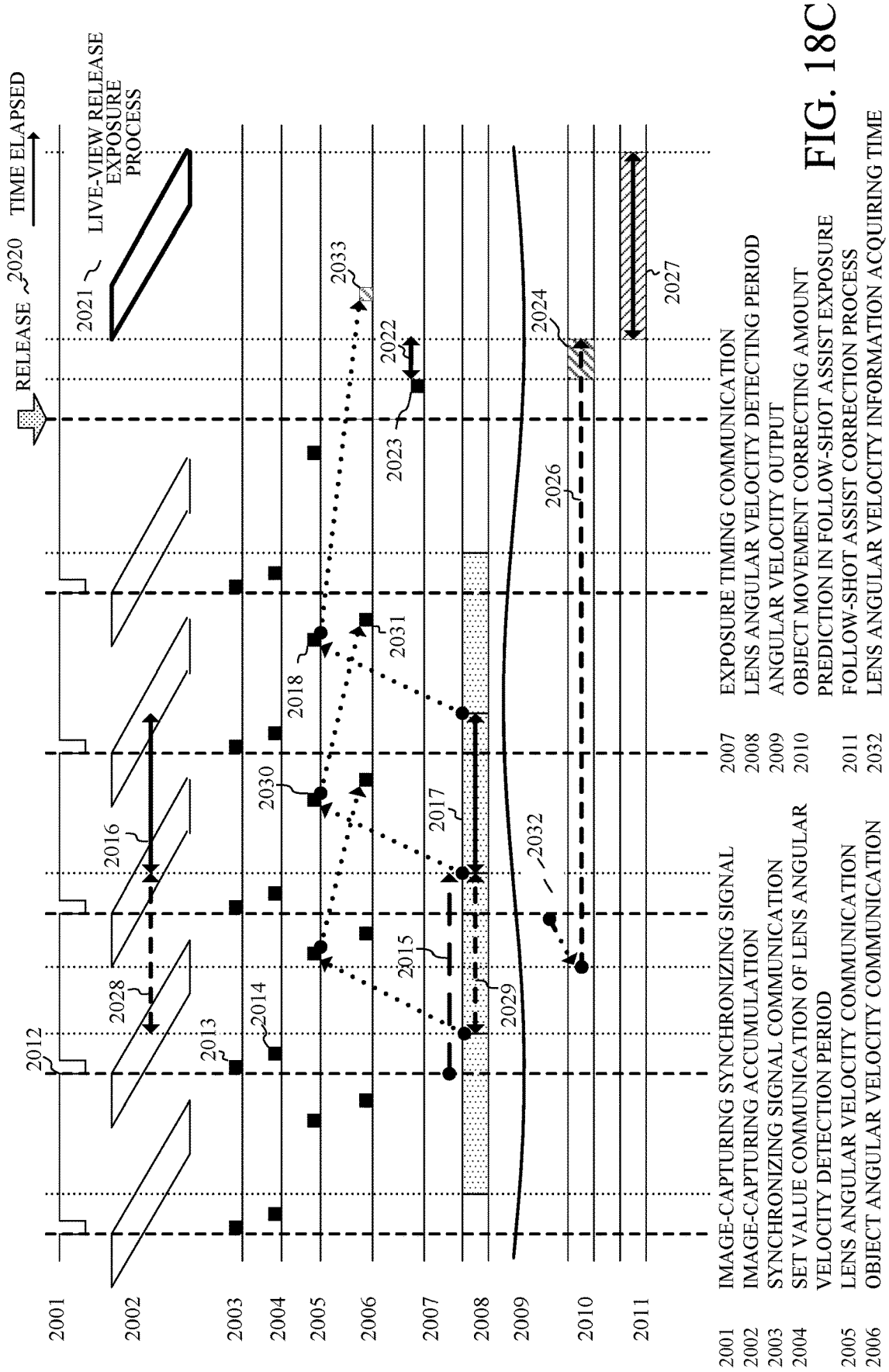

In FIG. 18A, a series of information exchanges between the camera body 100 and the interchangeable lens 200 are completed within the predetermined image-capturing synchronizing signal period. However, another communication process, such as the AF and the AE, is performed between the camera body 100 and the interchangeable lens 200 in addition to the follow-shot assist communication. Hence, a communication band may not be secured when the communication other than the follow-shot assist communication is performed, and for example, the lens angular velocity communication 2018 or the object angular velocity communication 2019 cannot be completed within the predetermined image capturing synchronizing period and may shift to the next image-capturing synchronizing signal period. Referring now to FIG. 18C, a description will be given of this case.

FIG. 18C illustrates a process in the next image-capturing synchronizing signal period as a result of that an object angular velocity communication 2033 cannot be completed in the predetermined image-capturing synchronizing signal period. In FIG. 18C, the live-view release exposure process request 2020 occurs before the object angular velocity communication 2033 is processed. In this case, in order to transfer to the live-view release exposure process, an object angular velocity communication 2033 illustrated by a diagonal line is not executed. Hence, the follow-shot assist process is performed based on the information in the last image-capturing synchronizing signal by the live-view release exposure process request 2020. In other words, the interchangeable lens 200 notifies the camera body 100 of the lens angular velocity information and the lens angular velocity detecting time through the lens angular velocity communication 2030 based on the angular velocity information detected in the lens angular velocity detecting period 2029 illustrated by a broken line. The camera body 100 generates the object angular velocity information based on the motion vector information detected in the motion vector detecting period 2028 illustrated by the broken line and the angular velocity information detected in the lens angular velocity detecting period 2029 illustrated by the broken line. The camera body notifies the interchangeable lens 200 of the generated object angular velocity information through the object angular velocity communication 2031. At this time, the lens angular velocity detecting time 2032 is stored in the object angular velocity communication 2031. Therefore, the follow-shot assist controller 134 does not have to store the lens angular velocity information acquiring time for each image-capturing synchronizing signal process. In other words, the follow-shot assist controller 134 can calculate the drive amount for the image stabilizing controller 209 in the live-view release exposure process with the expression (1) and only the information received in the object angular velocity communication 2031.

While this embodiment expresses the lens angular velocity communication 2005 and the object angular velocity communication 2006 as separate communications, this embodiment may define a data format as a full duplex communication and execute one communication process.

Figure 19:
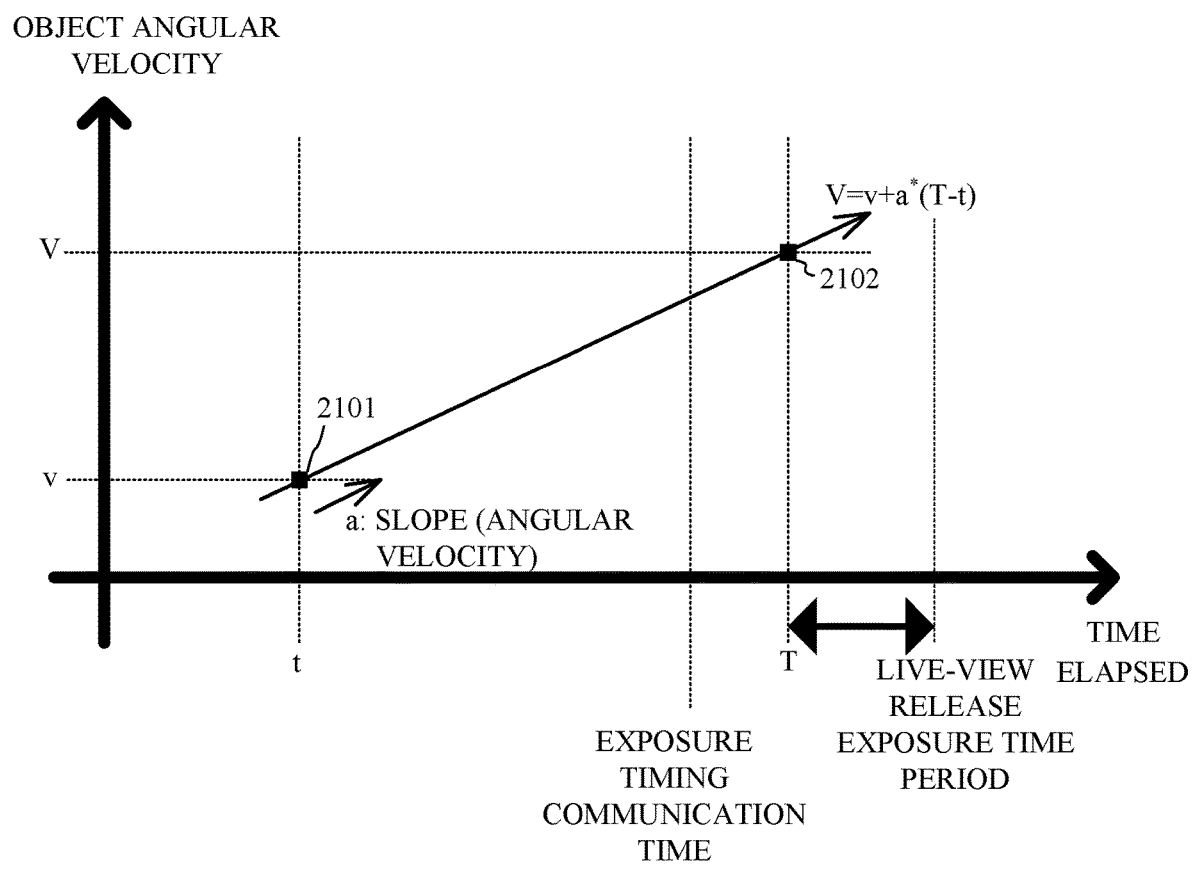
FIG. 19 is an explanatory view of a method for calculating a drive amount of an image stabilizing controller according to the third embodiment.

Referring now to FIG. 19, a description will be given of a drive amount calculating method for the image stabilizing controller 209 in the exposure. FIG. is an explanatory view of the drive amount calculating method for the image stabilizing controller 209 in exposure. In FIG. 19, an ordinate axis denotes an object angular velocity, and an abscissa axis denotes time (elapsed time).

A point 2101 represents information in the lens angular velocity detection as a start point for calculating the follow-shot assist correction amount. "t" is a lens angular velocity detecting time, and "v" is object angular velocity information generated based on the motion vector information of the camera body 100 executed at the same timing as the lens angular velocity detecting period and the lens angular velocity detecting period. The lens angular velocity detecting time t is center of gravity time in the lens angular velocity detecting period 1017 in FIG. 18A, and it is the center of gravity time in the lens angular velocity detecting period 2029 in FIGS. 18B and 18C. The object angular velocity information v is information sent to the interchangeable lens 200 in the object angular velocity communication 2019 in FIG. 18A, and the information sent to the interchangeable lens 200 in the object angular velocity communication 2031 in FIGS. 18B and 18C. The object angular velocity information in the point 2101 contains the object angular acceleration information "a," and enables the object angular velocity V in the live-view release exposure process in the point 2102 to be linearly predicted with the predictive expression (expression (1)).

In this embodiment, the interchangeable lens sends the lens angular velocity detecting time and the lens angular velocity detecting information to the camera body. The camera body generates the object angular velocity information based on the lens angular velocity information and the motion vector information received from the interchangeable lens, and sends the object angular velocity information and the lens angular velocity detecting time to the interchangeable lens. This configuration can provide a lens interchangeable camera system having a follow-shot assist function which can properly predict a moving amount of an object and correct it with an image stabilizing controller in a live-view release exposure process operated by the photographer at an arbitrary timing.

Fourth Embodiment

Next follows a description of a fourth embodiment according to the present invention. This embodiment more accurately corrects an object moving amount in the live-view release exposure process. The basis configuration of this embodiment is the same as that in the third embodiment.

The third embodiment linearly predicts the object moving amount in exposure by using one piece of object angular velocity information sent to the interchangeable lens 200 just before the live-view release exposure process, as illustrated in FIG. 19. In general, the camera body 100 and the object gradually approach to each other in the image capturing scene that needs the follow shot, and thus the object moving amount to be corrected in exposure acceleratively increases. Hence, the linear interpolation in the third embodiment may increase an error in an interpolation amount. Accordingly, this embodiment stores a plurality of pieces of object angular velocity information to be sent from the camera body 100 to the interchangeable lens 200, and predicts the moving amount of the object in the live-view release exposure process with a polynomial.

Figure 20:
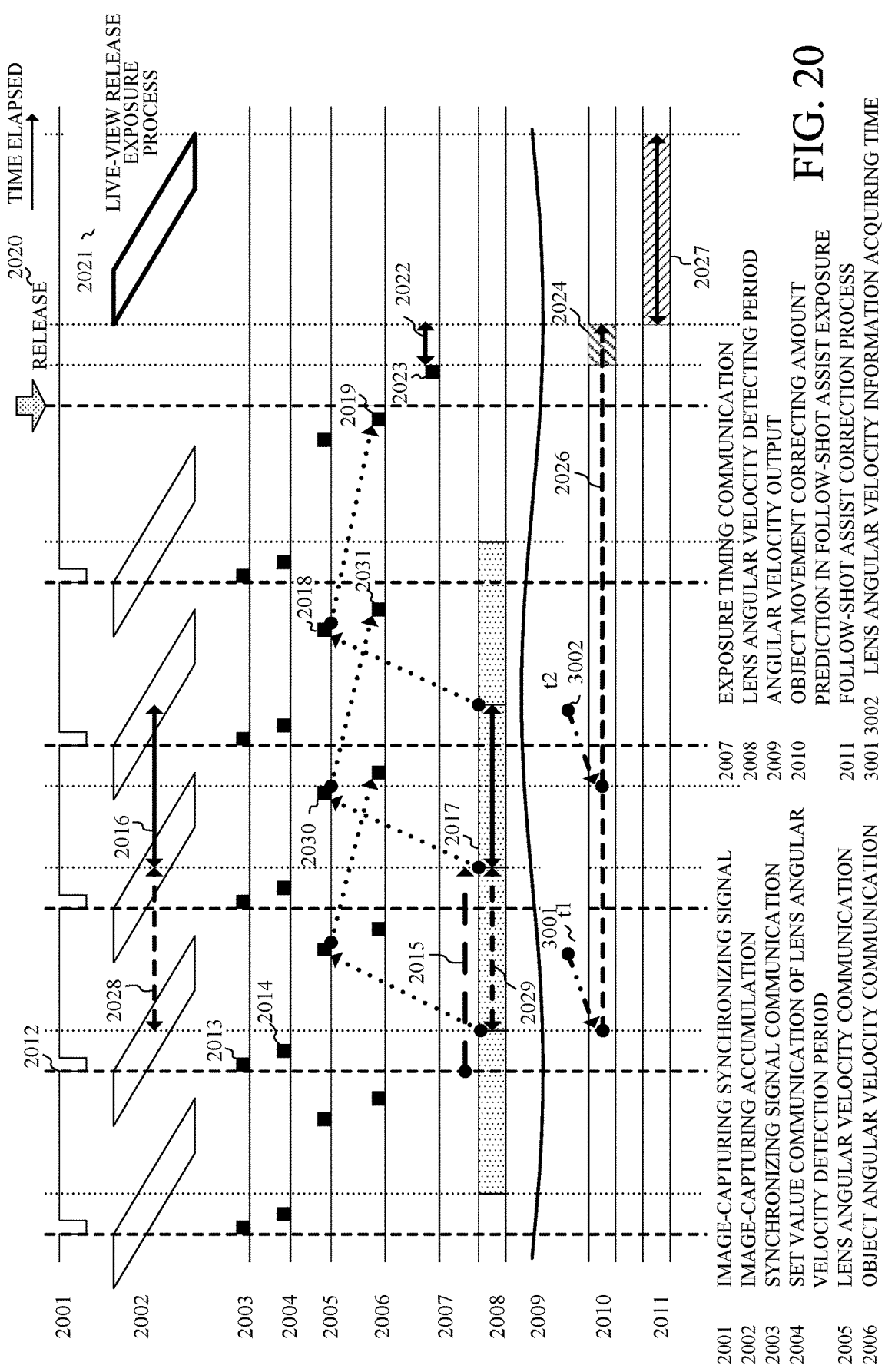
FIG. 20 is a timing chart of a follow-shot assist process by a camera system according to a fourth embodiment.

Referring to FIG. 20, a description will be given of a follow-shot assist process in the camera system 10 (including the camera body 100 and the interchangeable lens 200). FIG. 20 is a timing chart of the follow-shot assist process in the camera system 10. FIG. 20 illustrates a process timing of the camera system 10 in the follow-shot assist mode in the live-view imaging mode where the attached interchangeable lens 200 is compatible with the follow-shot assist. In FIG. 20, reference numerals 2001 to 2027 are the same as reference numerals 2001 to 2027 in FIG. 18A described in the third embodiment.

Unlike the third embodiment, this embodiment uses the object angular velocity information in two periods, i.e., the motion vector detecting period 2028 (with the same timing as that of the lens angular velocity detecting period 2029) and the motion vector detecting period 2016 (with the same timing as that of the lens angular velocity detecting period 2017). The object angular velocity information in the motion vector detecting period 2028 is sent to the interchangeable lens 200 by the object angular velocity communication 2031. The object angular velocity information in the motion vector detecting period 2016 is sent to the interchangeable lens 200 by the object angular velocity communication 2019.

Figure 21:
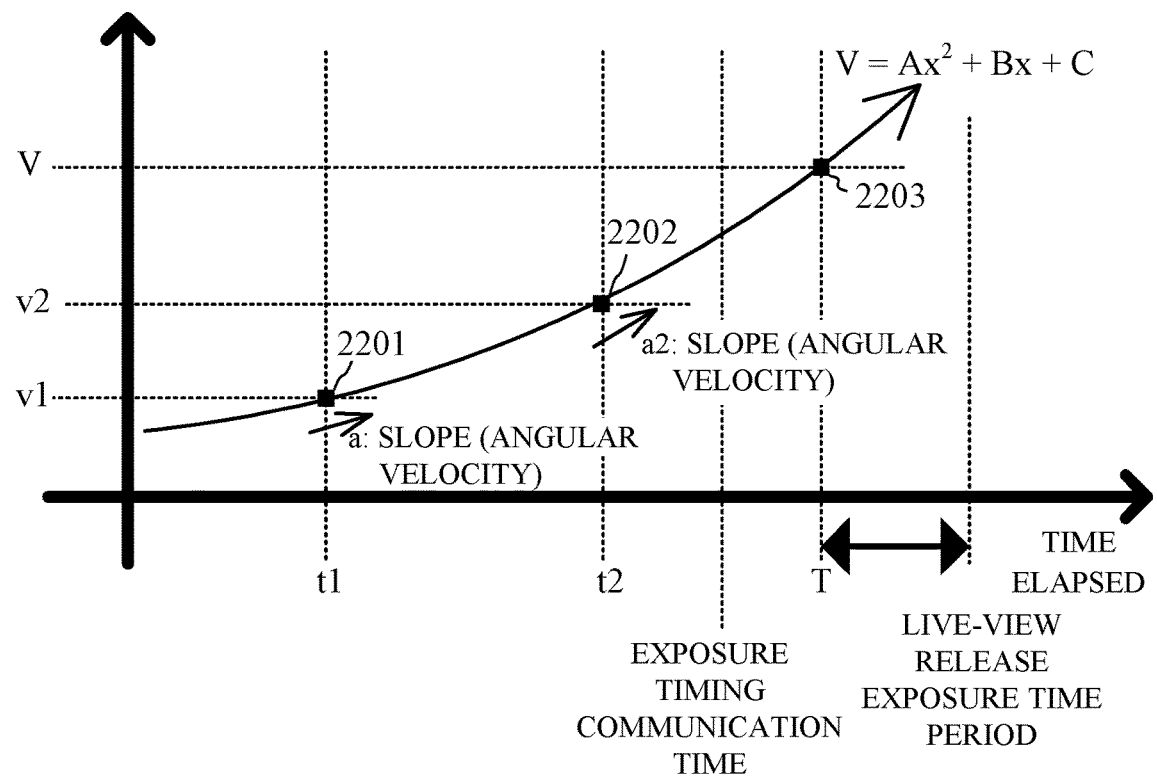
FIG. 21 is an explanatory view of a calculation method of a drive amount of an image stabilizing controller according to the fourth embodiment.

Referring now to FIG. 21, a description will be given of the calculation method of the drive amount of the image stabilizing controller 209 in exposure. FIG. 21 is an explanatory view of a calculation method of a drive amount of the image stabilizing controller 209 in exposure. In FIG. 21, an ordinate axis denotes an object angular velocity, and an abscissa axis denotes time (elapsed time).

In FIG. 21, a point 2201 represents information sent to the interchangeable lens 200 by the object angular velocity communication 2031, and contains information of an object angular velocity v1 and an object angular acceleration a1 at time t1. A point 2202 represents information sent to the interchangeable lens 200 by the object angular velocity communication 1019, and contains information of an object angular velocity v2 and an object angular acceleration a2 at time t2.

A secondary predictive expression can be calculated based on the information at these two points (points 2201 and 2202), and this embodiment makes a calculation with the following expression (3).

$$Y = Ax^2 + Bx + C \quad (3)$$
$$A = \frac{(a1 - a2)}{2(t1 - t2)}$$
$$B = \frac{\{2(v1 - v2) - (a1 - a2)(t1 - t2)\}}{2(t1 - t2)}$$
$$C = v1 - \frac{(a1 - a2)t1^2}{2(t1 - t2)} - \frac{t1\{2(v1 - v2) - (a1 - a2)(t1 + t2)\}}{2(t1 - t2)}$$

Object angular velocity information V in exposure or at a point 2203 is calculated with the expression (3). This embodiment calculates an object moving amount in the live-view release exposure process based on the object velocity information at two points before the live-view release exposure process, but may use a polynomial for the prediction with three or more points.

In this embodiment, the interchangeable lens sends the lens angular velocity detecting information and the lens angular velocity detecting time to the camera body. The camera body generates the object angular velocity information based on the lens angular velocity information and the motion vector information received from the interchangeable lens, and sends the generated object angular velocity information and lens angular velocity detecting time to the interchangeable lens. Due to this configuration, the interchangeable lens can precisely predict the moving amount of the object in exposure using a plurality of pieces of object angular velocity information and angular velocity detecting time. Hence, this embodiment can provide a lens interchangeable camera system equipped with the follow-shot assist function, which can more accurately predict a moving amount of the object in exposure and correct the moving amount with the image stabilizing controller.

In each embodiment, the control apparatus in the camera body 100 includes a calculator (follow-shot assist controller 134) and a communicator (lens communication controller 133) configured to receive the angular velocity detected in the angular velocity detecting period and the angular velocity detecting time information. The calculator calculates the angular velocity information of the object based on the motion vector and the angular velocity. The communicator sends the object angular velocity information the angular velocity detecting time information correlated with each other and the exposure start timing.

In each embodiment, the control apparatus in the interchangeable lens 200 includes a communicator (I/F 220) configured to receive the angular velocity detecting period set based on the motion vector detecting period, and the calculator (lens controller 210) configured to calculate the object angular velocity information in exposure. The communicator (communication unit) sends the angular velocity detected in the angular velocity detecting period and the angular velocity detecting time information, receives the calculated object angular velocity information correlated with the angular velocity detecting time information based on the motion vector and the angular velocity, and receives the exposure start timing. The calculator calculates the object angular velocity information in exposure based on the received object angular velocity information, the angular velocity detecting time information, and the exposure start timing. The calculator may control an image stabilization based on the object angular velocity information in exposure. The calculator may calculate the object angular velocity information in exposure based on the object angular velocity information received just before the exposure start timing. The communicator may receive a plurality of pieces of object angular velocity information obtained at different timings before receiving the exposure start timing. The communicator calculates the object angular velocity information in exposure by using a plurality of pieces of the object angular velocity information. The communicator may transmit the angular velocity detected in the angular velocity detecting period and receive the object angular velocity information in the same communication process by a full duplex communication.

Each embodiment can provide a control apparatus, an image capturing apparatus, a lens apparatus, a control method, and a storage medium, which can feed back a follow-shot assist result to a photographer when a follow-shot correction amount exceeds a movable range of an image stabilizing control lens, or improve a follow-shot assist performance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2016-145112 and 2016-145254, each filed on Jul. 25, 2016, which are hereby incorporated by reference herein in their entirety.

What is claimed is:

1. An accessory apparatus attachable to an imaging apparatus, the accessory apparatus comprising:
a communication interface configured to communicate with the imaging apparatus; and
a detector configured to detect an angular velocity,
at least one of (a) circuitry and (b) at least one processor, configured to act as a control unit configured to control a lens based on the detected angular velocity but not based on first information in a first mode, and based on the first information in a second mode,
wherein the communication interface transmits, in the second mode, (a) second information indicating the angular velocity and (b) third information indicating a time when the angular velocity was detected by the detector,
wherein the communication interface receives, in the second mode, (a) the first information and (b) the third information which is the same information as the transmitted third information,
wherein the first information, the second information, and the third information are different information from one another,
wherein the angular velocity detected by the detector is the angular velocity of the lens,
wherein the imaging apparatus determines a motion vector corresponding to an object,
wherein the first information comprises an angular velocity of the object and is determined by the imaging apparatus in accordance with (a) the angular velocity of the lens, (b) a focal length of the lens, and (c) the motion vector corresponding to the object,
wherein the third information indicating the time when the angular velocity was detected by the detector identifies a period of time during which the angular velocity was detected by the detector, and
wherein the period of time during which the angular velocity was detected by the detector coincides with a period of time during which the motion vector corresponding to the object was determined by the imaging apparatus.

2. The accessory apparatus according to claim 1, wherein the communication interface receives fourth information related to a detection timing of the angular velocity, and
wherein the detector detects the angular velocity at a timing based on the fourth information.

3. The accessory apparatus according to claim 2, wherein the communication interface receives fifth information,
wherein a reception of the fifth information corresponds to an exposure start timing, and
wherein the detector detects the angular velocity at a timing based on the fifth information.

4. The accessory apparatus according to claim 1, wherein the at least one of (a) circuitry and (b) at least one processor is further configured to act as a calculator configured to calculate a lens control amount, and
wherein the calculator calculates the lens control amount based on the first information, the third information, and angular acceleration information.

5. The accessory apparatus according to claim 4, wherein the communication interface transmits the angular velocity with the third information so that the angular velocity and the third information are transmitted in the same communication, and
wherein the communication interface receives the first information with the third information so that the first information and the third information are received in the same communication.

6. The accessory apparatus according to claim 1, wherein the reception of the first information and the third information is performed after the transmission of the second information and the third information.

7. The accessory apparatus according to claim 1, wherein the accessory apparatus is a lens apparatus.

8. The accessory apparatus according to claim 1, wherein the accessory apparatus is a lens apparatus comprising the lens, and
wherein the imaging apparatus is a camera.

9. A control method for an accessory apparatus attachable to an imaging apparatus, the accessory apparatus including a communication interface configured to communicate with the imaging apparatus, the control method comprising the steps of:
detecting an angular velocity;
controlling a lens based on the detected angular velocity but not based on first information in a first mode, and based on the first information in a second mode;

transmitting, in the second mode, (a) second information indicating the angular velocity and (b) third information indicating a time when the angular velocity was detected;

receiving, in the second mode, (a) the first information and (b) the third information which is the same information as the transmitted third information, wherein the first information, the second information, and the third information are different information from one another, wherein the angular velocity detected by the detecting is the angular velocity of the lens, wherein the imaging apparatus determines a motion vector corresponding to an object, wherein the first information comprises an angular velocity of the object and is determined by the imaging apparatus in accordance with (a) the angular velocity of the lens, (b) a focal length of the lens, and (c) the motion vector corresponding to the object, wherein the third information indicating the time when the angular velocity was detected identifies a period of time during which the angular velocity was detected by the detecting, and wherein the period of time during which the angular velocity was detected by the detecting coincides with a period of time during which the motion vector corresponding to the object was determined by the imaging apparatus.

10. The control method according to claim 9, further comprising the step of calculating a lens control amount, wherein the lens control amount is calculated based on the first information, the third information, and angular acceleration information.

11. A control apparatus comprising:

a communication interface configured to communicate with an accessory apparatus, wherein the accessory apparatus comprises at least one of (a) circuitry and (b) at least one processor, configured to act as a control unit configured to control a lens based on angular velocity detected by a detector of the accessory apparatus but not based on first information in a first mode, and based on the first information in a second mode, wherein the communication interface receives, in the second mode, (a) second information indicating an angular velocity detected by the detector of the accessory apparatus and (b) third information indicating a time when the angular velocity was detected by the detector, wherein the communication interface transmits, in the second mode, (a) the first information and (b) the third information which is the same information as the received third information, wherein the first information, the second information, and the third information are different information from one another, wherein the angular velocity detected by the detector is the angular velocity of the lens, wherein the control apparatus determines a motion vector corresponding to an object, wherein the first information comprises an angular velocity of the object and is determined by the control apparatus in accordance with (a) the angular velocity of the lens, (b) a focal length of the lens, and (c) the motion vector corresponding to the object, wherein the third information indicating the time when the angular velocity was detected by the detector identifies a period of time during which the angular velocity was detected by the detector, and wherein the period of time during which the angular velocity was detected by the detector coincides with a period of time during which the motion vector corresponding to the object was determined by the control apparatus.

12. The control apparatus according to claim 11, wherein the communication interface receives the angular velocity with the third information so that the angular velocity and the third information are received in the same communication, and wherein the communication interface transmits the first information with the third information so that the first information and the third information are transmitted in the same communication.

13. The imaging apparatus according to claim 11, wherein the communication interface transmits fourth information related to a detection timing of the angular velocity, and wherein the detector detects the angular velocity at a timing based on the fourth information.

14. The control apparatus according to claim 11, wherein the communication interface transmits fifth information, wherein a transmission of the fifth information corresponds to an exposure start timing, and wherein the detector detects the angular velocity at a timing based on the fifth information.

15. The control apparatus according to claim 11, wherein the at least one of (a) circuitry and (b) at least one processor is further configured to act as a calculator configured to calculate a lens control amount, and wherein the calculator calculates the lens control amount based on the first information, the third information, and angular acceleration information.

16. The control apparatus according to claim 11, wherein the transmission of the first information and the third information is performed after the reception of the second information and the third information.

17. The control apparatus according to claim 11, wherein the control apparatus is an image capturing apparatus.

18. A control method for a control apparatus including a communication interface configured to communicate with an accessory apparatus, wherein the accessory apparatus includes at least one of (a) circuitry and (b) at least one processor, configured to act as a control unit configured to control a lens based on angular velocity detected by a detector of the accessory apparatus but not based on first information in a first mode, and based on the first information in a second mode, the control method comprising the steps of:

receiving, in the second mode, (a) second information indicating the angular velocity detected by the detector of the accessory apparatus and (b) third information indicating a time when the angular velocity was detected by the detector; and transmitting, in the second mode, (a) the first information and (b) the third information which is the same information as the received third information, wherein the first information, the second information, and the third information are different information from one another, wherein the angular velocity detected by the detector is the angular velocity of the lens, wherein the control apparatus determines a motion vector corresponding to an object, wherein the first information comprises an angular velocity of the object and is determined by the control apparatus in accordance with (a) the angular velocity of the lens, (b) a focal length of the lens, and (c) the motion vector corresponding to the object, wherein the third information indicating the time when the angular velocity was detected by the detector identifies a period of time during which the angular velocity was detected by the detector, and wherein the period of time during which the angular velocity was detected by the detector coincides with a period of time during which the motion vector corresponding to the object was determined by the control apparatus.

* * * * *